United States Patent
Shin

(10) Patent No.: US 9,628,726 B2
(45) Date of Patent: Apr. 18, 2017

(54) IMAGE SENSING DEVICE

(71) Applicant: SK hynix Inc., Gyeonggi-do (KR)

(72) Inventor: Min-Seok Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 73 days.

(21) Appl. No.: 14/491,707

(22) Filed: Sep. 19, 2014

(65) Prior Publication Data

US 2015/0296156 A1  Oct. 15, 2015

(30) Foreign Application Priority Data

Apr. 11, 2014  (KR) .................. 10-2014-0043319

(51) Int. Cl.
| | |
|---|---|
| *H04N 5/238* | (2006.01) |
| *H04N 5/335* | (2011.01) |
| *H04N 5/235* | (2006.01) |
| *H04N 5/355* | (2011.01) |
| *H04N 5/374* | (2011.01) |
| *H04N 5/378* | (2011.01) |
| *H04N 9/04* | (2006.01) |

(52) U.S. Cl.
CPC ...... *H04N 5/35572* (2013.01); *H04N 5/35554* (2013.01); *H04N 5/374* (2013.01); *H04N 5/378* (2013.01); *H04N 9/045* (2013.01)

(58) Field of Classification Search
CPC .... H04N 5/2355; H04N 5/355–5/3559; H04N 5/353–5/3537; H04N 5/35572; H04N 9/045; H04N 5/232; H04N 2209/043; H04N 5/347; H04N 5/374–5/37457; G06T 2207/20208; G03B 2207/00–2207/005; H01L 27/14643–27/14663

USPC .............. 348/362, 277, 280, 270, 268, 273; 250/208.1

See application file for complete search history.

(56) References Cited

U.S. PATENT DOCUMENTS

| | | | | |
|---|---|---|---|---|
| 7,697,049 | B1* | 4/2010 | Lavi | H04N 5/3452 348/305 |
| 2010/0141812 | A1* | 6/2010 | Hirota | H04N 9/045 348/279 |
| 2010/0157078 | A1* | 6/2010 | Atanassov | G06T 5/007 348/222.1 |
| 2010/0315534 | A1* | 12/2010 | Azuma | H04N 9/045 348/234 |
| 2014/0027613 | A1* | 1/2014 | Smith | H04N 5/2352 250/208.1 |

(Continued)

FOREIGN PATENT DOCUMENTS

| | | |
|---|---|---|
| JP | 2012-234393 | 11/2012 |
| KR | 1020070064833 | 6/2007 |

*Primary Examiner* — Xi Wang
(74) *Attorney, Agent, or Firm* — IP & T Group LLP

(57) ABSTRACT

An image sensing device includes: a pixel unit including a first sub-pixel and a second sub-pixel corresponding to a single color; a row control block suitable for controlling exposure times of the first and second sub-pixels differently from one another during an exposure time section, and controlling a first sub-pixel signal and a second sub-pixel signal to be outputted from the first and second sub-pixels during a single row line unit time during a read time section; and an image process block suitable for generating three or more image data which have different exposure times based on the first and second sub-pixel signals.

17 Claims, 14 Drawing Sheets

(56) References Cited

U.S. PATENT DOCUMENTS

2014/0063300 A1* 3/2014 Lin ................... H04N 9/045
                                            348/277
2014/0192227 A1* 7/2014 Zhang ................ H04N 9/045
                                            348/230.1
2014/0192250 A1* 7/2014 Mitsunaga ......... H04N 5/3535
                                            348/349

* cited by examiner

IMAGE SENSING DEVICE

CROSS-REFERENCE TO RELATED APPLICATIONS

The present application claims priority of Korean Patent Application No. 10-2014-0043319, filed on Apr. 11, 2014, which is incorporated herein by reference in its entirety.

BACKGROUND

1. Field

Various exemplary embodiments of the present invention relate to a semiconductor design technology and, more particularly, to an image sensing device.

2. Description of the Related Art

Image sensing devices capture images using the photosensitive properties of semiconductors. Image sensing devices may be classified into charge coupled device (CCD) image sensors and complementary metal oxide semiconductor (CMOS) image sensors. The CMOS image sensing devices have come into widespread use. This is because CMOS image sensing devices allow for analog circuits and digital control circuits to be realized on a single integrated circuit (IC).

SUMMARY

Various exemplary embodiments of the present invention are directed to an image sensing device with improved dynamic range.

In accordance with an embodiment of the present invention, an image sensing device includes: a pixel unit including a first sub-pixel and a second sub-pixel corresponding to a single color; a row control block suitable for controlling exposure times of the first and second sub-pixels differently from one another during an exposure time section, and controlling a first sub-pixel signal and a second sub-pixel signal to be outputted from the first and second sub-pixels during a single row line unit time during a read time section; and an image process block suitable for generating three or more image data which have different exposure times based on the first and second sub-pixel signals.

Herein, the single row line unit time may be defined by the following Equation 1.

Single row line unit time=1/frame rate/the total number of the rows [Equation 1]

In Equation 1, the total number of the rows is determined based on the pixel unit.

DETAILED DESCRIPTION

Exemplary embodiments of the present invention are described below in more detail with reference to the accompanying drawings. These embodiments are provided so that this disclosure is thorough and complete, and fully convey the scope of the present invention to those skilled in the art. All "embodiments" referred to in this disclosure refer to embodiments of the inventive concept disclosed herein. The embodiments presented are merely examples and are not intended to limit the inventive concept.

Figure 1:
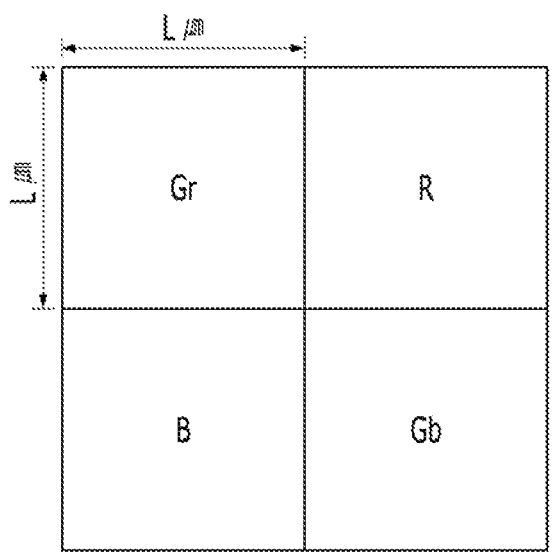
FIG. 1 is a schematic diagram illustrating a pixel array included in an image sensing device.

FIG. 1 is a schematic diagram illustrating a pixel array included in an image sensing device.

Referring to FIG. 1, the image sensing device may include a pixel array where a plurality of pixel units are arranged in a matrix form. The pixel array may be arranged in a Bayer pattern. The Bayer pattern may be formed of repetitive cells, each of which comprises 2-by-2 pixel units. In each of the cells, pixel units respectively corresponding to two green colors Gr and Gb may be disposed diagonal to each other, and pixel units respectively corresponding to a red color R and a blue color B may be disposed diagonal to each other in the other corners.

Herein, each of the pixel units has a predetermined size of L μm×L μm, and outputs single pixel signal per single frame.

Figure 2:
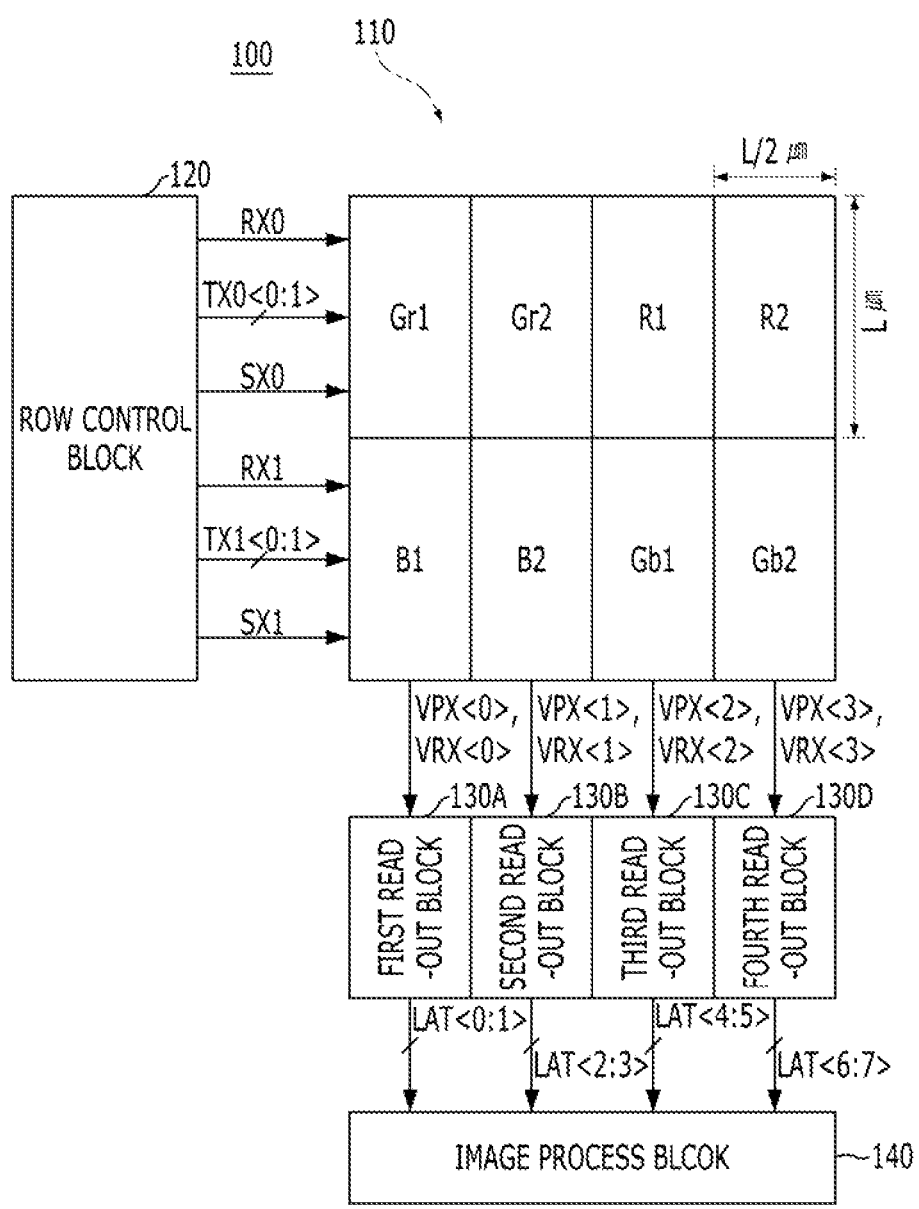
FIG. 2 is a block diagram illustrating an image sensing device in accordance with an exemplary embodiment of the present invention.

FIG. 2 is a block diagram illustrating an image sensing device in accordance with an exemplary embodiment of the present invention.

The image sensing device in accordance with embodiment may exemplarily comprise a cell of 2-by-2 pixel units, described above with reference to FIG. 1.

Referring to FIG. 2, an image sensing device 100 may include a pixel array 110, a row control block 120, first to fourth read-out blocks 130A, 130B, 130C and 130D and an image process block 140. The pixel array 110 may include first to fourth pixel units arranged in a matrix form. The row control block 120 may control an operation of the pixel array 110 on a row-by-row basis during an exposure time section and a read time section. The first to fourth read-out blocks 130A, 130B, 130C and 130D may read out first to fourth sub-pixel signals VPX<0:3>, which are outputted on a row-by-row basis from the pixel array 110 during the read time section. The image process block 140 may process first to eighth latch signals LAT<0:7>, which are outputted from the first to fourth read-out blocks 130A, 130B, 130C and 130D.

The pixel array 110 may include the first to fourth pixel units arranged in a matrix form. For example, the pixel array 110 may be arranged in a Bayer pattern. The pixel array 110 may be controlled based on control signals which are applied on a row-by-row basis from the row control block 120. For example, the first and second pixel units included in a first row may operate in response to a selection signal SX0, first and second transmission signals TX0<0:1>, and a first reset signal RX0. The third and fourth pixel units included in a second row may operate in response to a second selection signal SX1, third and fourth transmission signals TX1<0:1> and a second reset signal RX1.

Particularly, each of the first to fourth pixel units may include two sub-pixels corresponding to an original color assigned thereto. Each of the sub-pixels may have a predetermined size of L/2 μm×L μm. For example, the first pixel unit corresponding to a green color Gr may include first and second sub-pixels Gr1 and Gr2 corresponding to the green color Gr, and the second pixel unit corresponding to a red color R may include first and second sub-pixels R1 and R2 corresponding to the red color R, and the third pixel unit corresponding to a blue color B may include first and second sub-pixels B1 and B2 corresponding to the blue color B, and the fourth pixel unit corresponding to a green color Gb may include first and second sub-pixels Gb1 and Gb2 corresponding to the green color Gb.

Figure 3:
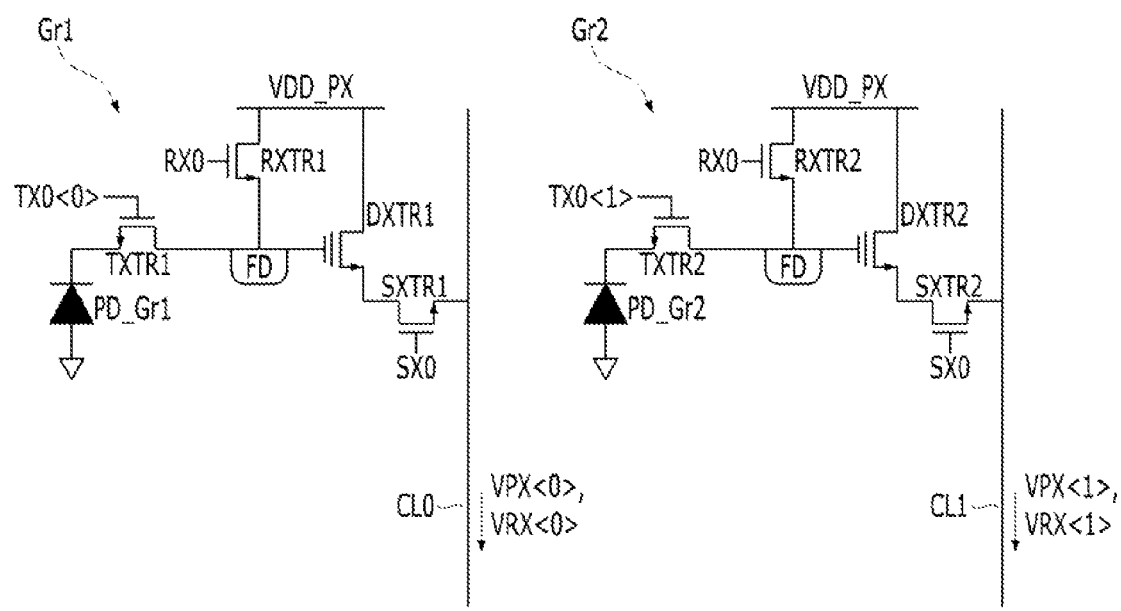
FIG. 3 is a circuit diagram illustrating a first pixel unit shown in FIG. 2.

FIG. 3 is a circuit diagram illustrating the first pixel unit shown in FIG. 2.

The first to fourth pixel units may have the same structure as one another, and FIG. 3 exemplarily shows the first pixel unit.

Referring to FIG. 3, the first pixel unit may include the first and second sub-pixels Gr1 and Gr2 as described above. The first sub-pixel Gr1 may include four transistors, which operate based on the first transmission signal TX0<0>, the first reset signal RX0, and the first selection signal SX0. The first sub-pixel Gr1 may be independently coupled with a first column line CL0, and selectively output the first sub-pixel signal VPX<0>, and a first sub-reset signal VRX<0> through the first column line CL0. The second sub-pixel Gr2 may include four transistors, which operate based on the second transmission signal TX0<1>, the first reset signal RX0 and the first selection signal SX0. The second sub-pixel Gr2 may be independently coupled with a second column line CL1, and selectively output the second sub-pixel signal VPX<1> and a second sub-reset signal VRX<1> through the second column line CL1.

Referring back to FIG. 2, the row control block 120 may control the first sub-pixels Gr1, R1, B1 and Gb1 to be exposed for first and second exposure times, and control the second sub-pixels Gr2, R2, B2 and Gb2 to be exposed for third and fourth exposure times during the exposure time section. The first to fourth exposure times may be different from each other.

The row control block 120 may control the first and third sub-pixel, signals VPX<0> and VPX<2> corresponding to the first exposure time, and the second and fourth sub-pixel signals VPX<1> and VPX<3> corresponding to the third exposure time during an initial period time of single row line unit time during the read time section.

The row control block 120 may control the first to fourth sub-reset signals VRX<0:3> during a medium period time of the single row line unit time during the read time section.

The row control block 120 may control the first and third sub-pixel signals VPX<0> and VPX<2> corresponding to the second exposure time, and the second and fourth sub-pixel signals VPX<1> and VPX<3> corresponding to the fourth exposure time during a last period time of the single row line unit time during the read time section.

The single row line unit time is a read-out time assigned to each pixel unit, and may be defined by the following Equation 1.

Single row line unit time=1/frame rate/the total number of the rows [Equation 1]

The first to fourth read-out blocks 130A, 130B, 130C and 130D may be coupled with the first to fourth column lines CL0, CL1, CL2 and CL3, and read out the first to fourth sub-pixel signals VPX<0:3>, respectively, according to a delta-reset sampling (DRS) scheme and a correlated-double sampling (CDS) scheme. The first to fourth read-out blocks 130A, 130B, 130C and 130D may read out the pixel signals first, and then the reset signals according to the DRS scheme. Or, the first to fourth read-out blocks 130A, 130B, 130C and 130D may read out the reset signals first, and then the pixel signals according to the CDS scheme.

Figure 4:
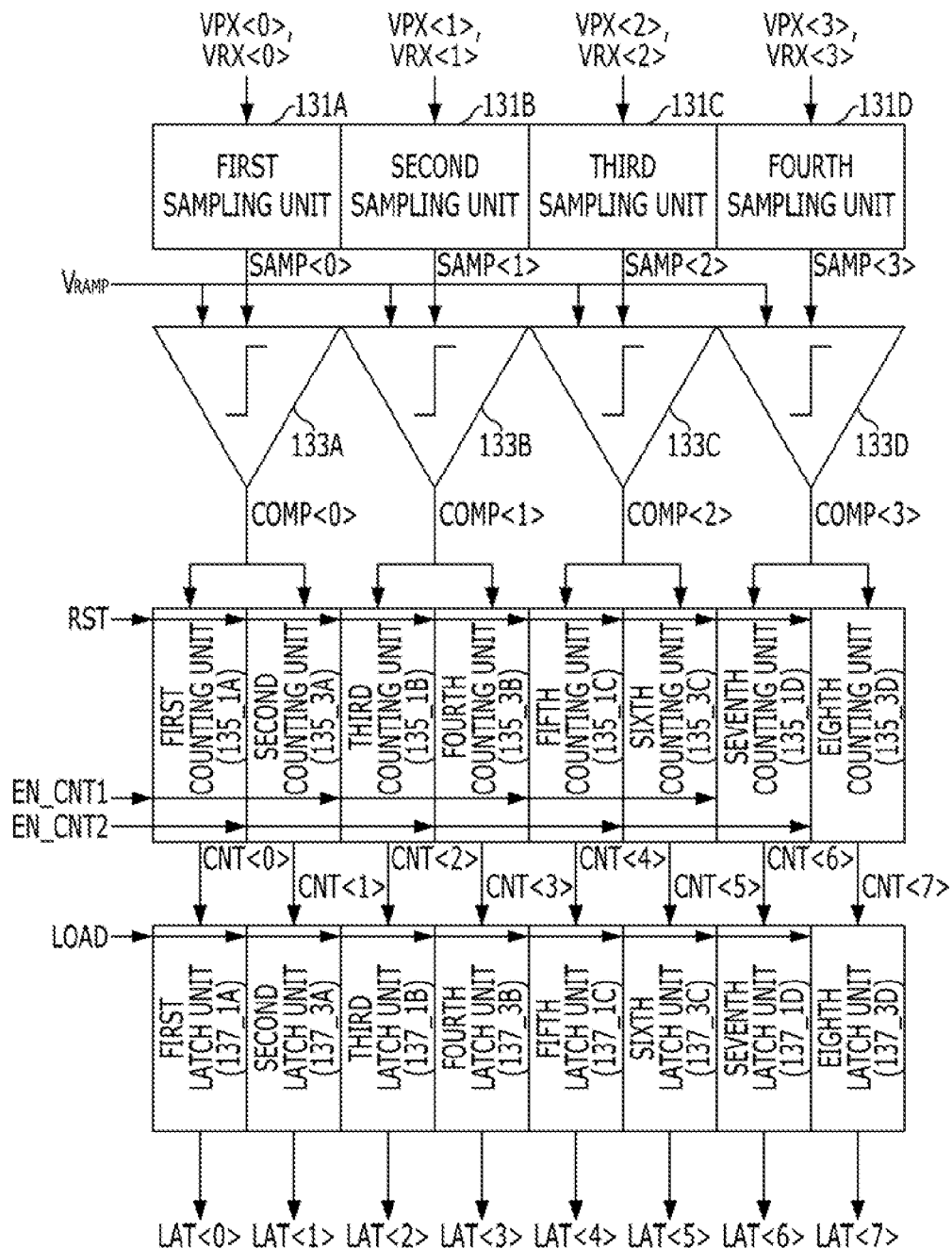
FIG. 4 is a block diagram illustrating read-out blocks shown in FIG. 2.

FIG. 4 is a block diagram illustrating the first to fourth read-out blocks 130A, 130B, 130C and 130D shown in FIG. 2.

Referring to FIG. 4, the first read-out block 130A may include a first sampling unit 131A, a first comparison unit 133A, first and second counting units 135_1A and 135_3A, and first and second latch units 137_1A and 137_3A.

The first sampling unit 131A may sample the first sub-pixel signal VPX<0>, which corresponds to the first exposure time, and is inputted during the initial period time, and the first sub-reset signal VRX<0>, which is inputted during the medium period time. For example, the first sampling unit 131A may output a first front period out sampling signal, which represents the difference between the first sub-pixel signal VPX<0> and the first sub-reset signal VRX<0> (VRX<0>−VPX<0>) inputted during the initial and medium period times, as a first sampling signal SAMP<0>.

The first sampling unit 131A may sample the first sub-reset signal VRX<0> which is inputted during the medium period time, and the first sub-pixel signal VPX<0> which corresponds to the second exposure time, and is inputted during the last period time. For example, the first sampling unit 131A may output a first latter period output sampling signal, which represents the difference between the first sub-reset signal VRX<0> and the first sub-pixel signal VPX<0> (VRX<0>−VPX<0>) inputted during the medium and last period times, as the first sampling signal SAMP<0>.

To sum up, the first sampling unit 131A may sequentially output the first front period output sampling signal, which is sampled according to the DRS scheme, and then the first latter period output sampling signal, which is sampled according to the CDS scheme, as the first sampling signal SAMP<0>.

The first comparison unit 133A may compare a voltage level of the first sampling signal SAMP<0> with a voltage level of a ramp signal VRAMP, and generate a first comparison signal COMP<0> corresponding to a comparison result.

The first counting unit 135_1A may count the first comparison signal COMP<0> in response to a first counting enable signal EN_CNT1, which is enabled during the initial and medium period times, and generate a first counting signal CNT<0> corresponding to a counting result.

The second counting unit 135_3A may count the first comparison signal COMP<0> in response to a second counting enable signal EN_CNT2, which is enabled during the medium and last period times, and generate a second counting signal CNT<1> corresponding to a counting result.

The first latch unit 137_1A may latch the first counting signal CNT<0> in response to a latch control signal LOAD, which is enabled after the last period time.

The second latch unit 137_3A may latch the second counting signal CNT<1> in response to the latch control signal LOAD.

The second read-out block 130B may include a second sampling unit 131B, a second comparison unit 133B, third and fourth counting units 135_1B and 135_3B, and third and fourth latch units 137_1B and 137_3B.

The second sampling unit 131B may sample the second sub-pixel signal VPX<1>, which corresponds to the third exposure time, and is inputted during the initial period time, and the second sub-reset signal VRX<1>, which is inputted during the medium period time. For example, the second sampling unit 131B may output a second front period output sampling signal, which represent difference between the second sub-pixel signal VPX<1> and the second sub-reset signal VRX<1> (VRX<1>−VPX<1>) inputted during the initial and medium period times, as a second sampling signal SAMP<1>.

The second sampling unit 131B may sample the second sub-reset signal VRX<1>, which is inputted during the medium period time, and the second sub-pixel signal VPX<1>, which corresponds to the fourth exposure time, and is inputted during the last period time. For example, the second sampling unit 131B may output a second latter period output sampling signal, which represents the difference between the second sub-reset signal VRX<1> and the second sub-pixel signal VPX<1> (VRX<1>−VPX<1>) inputted during the medium and last period times, as the second sampling signal SAMP<1>.

To sum up, the second sampling unit 131B may sequentially output the second front period output sampling signal, which is sampled according to the DRS scheme, and then the second latter period output sampling signal, which is sampled according to the CDS scheme, as the second sampling signal SAMP<1>.

The second comparison unit 133B may compare a voltage level of the second sampling signal SAMP<1> with the voltage level of the ramp signal VRAMP, and generate a second comparison signal COMP<1> corresponding to a comparison result.

The third counting unit 135_1B may count the second comparison signal COMP<1> in response to the first counting enable signal EN_CNT1, and generate a third counting signal CNT<2> corresponding to a counting result.

The fourth counting unit 135_3B may count the second comparison signal COMP<1> in response to the second counting enable signal EN_CNT2, and generate a fourth counting signal CNT<3> corresponding to a counting result.

The third latch unit 137_1B may latch the third counting signal CNT<2> in response to the latch control signal LOAD.

The fourth latch unit 137_3B may latch the fourth counting signal CNT<3> in response to the latch control signal LOAD.

The third and fourth read-out blocks 130C and 130D may have the same structure as the first and second read-out blocks 130A and 130B.

Referring back to FIG. 2, the image process block 140 may generate first to sixth image data, which have different exposure time, based on the first to eighth latch signals LAT<0:7> latched in the first to eighth latch units 137_1A, 137_3A, 137_1B, 137_3B, 137_1C, 137_3C, 137_1D and 137_3D.

For example, the image process block 140 may generate the first image data having the longest exposure time among the first to third image data by combining the first and second latch signals LAT<0:1>, the second image data having a medium exposure time among the first to third image data based on the third latch signal LAT<2>, and the third image data having the shortest exposure time among the first to third image data based on the fourth latch signal LAT<3>.

Similarly, the image process block 140 may generate the fourth image data having the longest exposure time among the fourth to sixth image data by combining the fifth and sixth latch signals LAT<4:5>, the fifth image data having a medium exposure time among the fourth to sixth image data based on the seventh latch signal LAT<6>, and the sixth image data having the shortest exposure time among the fourth to sixth mage data based on the eighth latch signal LAT<7>.

As a result, the image process block 140 may generate the first to third image data having different exposure times in response to the first and second sub-pixel signals, e.g., VPX<0:1> which are outputted from a pixel unit during the single row line unit time. Also, the image process block 140 may generate the fourth to sixth image data having different exposure times in response to the third and fourth sub-pixel signals, e.g., VPX<2:3>, which are outputted from a pixel unit during the single row line unit time.

Hereafter, an operation of the image sensing device 100 having the aforementioned structure in accordance with an exemplary embodiment of the present invention is described with reference to FIGS. 5A to 6B.

In the description, the operation of the image sensing device 100 will be described with reference to the first pixel unit including the first and second sub-pixels Gr1 and Gr2 described above with reference to FIG. 3.

Figure 5A:
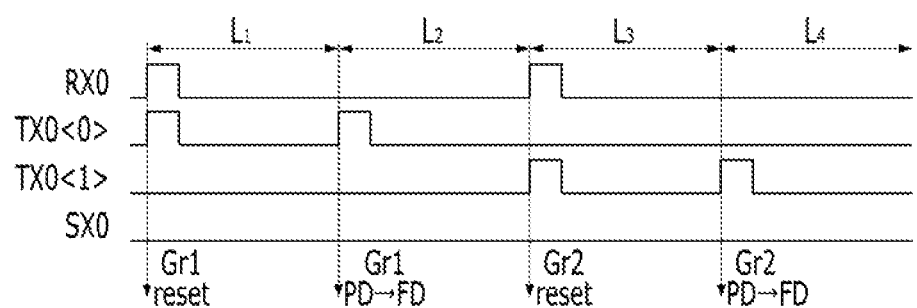
FIGS. 5A and 5B and FIGS. 6A and 6B are timing diagrams illustrating an operation of an image sensing device in accordance with an exemplary embodiment of the present invention.
Figure 5B:
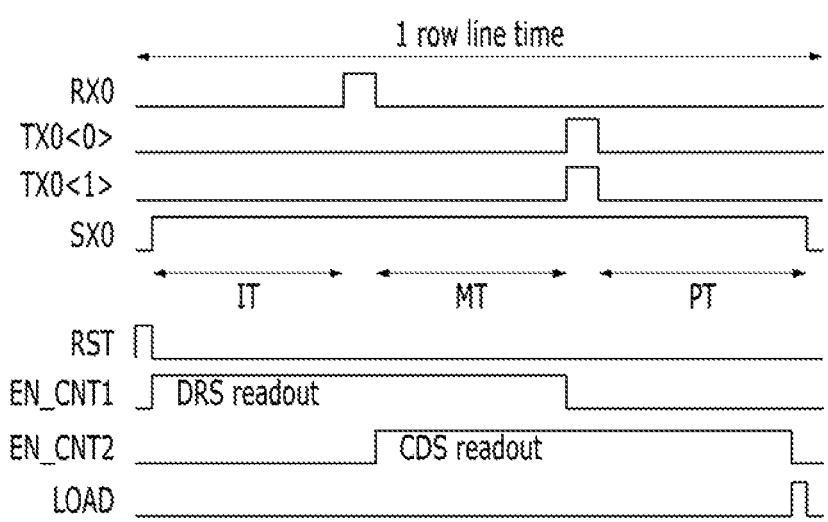

FIGS. 5A and 5B are timing diagrams illustrating the operation of the image sensing device 100.

FIG. 5A shows the operation of the image sensing device 100 during the exposure time section.

Referring to FIGS. 3 and 5A, the first sub-pixel Gr1 may be initialized in response to the first reset signal RX0 and the first transmission signal TX0<0>, which are simultaneously enabled at a predetermined moment. For example, during an initialization operation of the first sub-pixel Gr1 the photo-diode PD_Gr1 may be initialized while a charge existing in the photo-diode PD_Gr1 is discharged to a power source voltage VDD_VPX terminal through the transmission transistor TXTR1 and the reset transistor RXTR1.

The first sub-pixel Gr1 may store a charge formed in the photo-diode PD_Gr1 during a predetermined exposure time L1 in a floating diffusion node FD in response to the first transmission signal TX0<0>, which is enabled after the predetermined exposure time L1.

The second sub-pixel Gr2 may be initialized in response to the first reset signal RX0 and the second transmission signal TX0<1>, which are simultaneously enabled after a predetermined time L2. An initialization operation of the second sub-pixel Gr2 is the same as the initialization operation of the first sub-pixel Gr1 described above.

The second sub-pixel Gr2 may store a charge formed in the photo-diode PD_Gr2 during a predetermined exposure time L3 in the floating diffusion node FD in response to the second transmission signal TX0<1>, which is enabled after the predetermined exposure time L3.

FIG. 5B shows the operation of the age sensing device 100 during the read time section.

Referring to FIGS. 2, 3, 4, and 5B, the read time section may include the single row line unit time. As described above with reference to Equation 1, the single row line unit time is a read-out time assigned to each pixel unit. The first and second sub-pixel signals VPX<0:1> and the first and second sub-reset signals VRX<0:1> may be read out from the first and second sub-pixels Gr1 and Gr2 within the single row line unit time.

The first sub-pixel Gr1 may output the first sub-pixel signal VPX<0> corresponding to a charge, which is stored in the floating diffusion node FD, to the first read-out block 130A during an initial period time IT in response to the first selection signal SX0. Simultaneously, the second sub-pixel Gr2 may output the second sub-pixel signal VPX<1> corresponding to a charge, which is stored in the floating diffusion node FD, to the second read-out block 130B during the initial period time IT in response to the first selection signal SX0.

The first sub-pixel Gr1 may output the first sub-reset signal VRX<0> to the first read-out block 130A during a medium period time MT in response to the first reset signal RX0, which is enabled when the initial period time IT ends. Simultaneously, the second sub-pixel Gr2 may output the second sub-reset signal VRX<1> to the second read-out block 130B during the medium period time MT in response to the first reset signal RX0.

The first read-out block 130A may read out the first sub-pixel signal VPX<0> and the first sub-reset signal VRX<0>, which are sequentially inputted during the initial and medium period times IT and MT according to the DRS scheme.

To be specific the first sampling unit 131A may generate the first sampling signal SAMP<0> by sampling the first sub-pixel signal VPX<0> and the first sub-reset signal VRX<0> according to the DRS scheme, and the first comparison unit 133A may generate the first comparison signal COMP<0> by comparing the voltage level of the first sampling signal SAMP<0> with the voltage level of the ramp signal VRAMP, and the first counting unit 135_1A may count the first comparison signal COMP<0> in response to the first counting enable signal EN_CNT1, which is enabled during the initial and medium period times IT and MT, and the first latch unit 137_1A may latch the first counting signal CNT<0> which is outputted from the first counting unit 135_1A, in response to the latch control signal LOAD, which is enabled when a last period time PT ends. The first latch signal LAT<0> which is latched in the first latch unit 137_1A, may correspond to a predetermined exposure time L1.

Simultaneously, the second read-out block 130B may read out the second sub-pixel signal VPX<1> and the second sub-reset signal VRX<1>, which are sequentially inputted during the initial and medium period times IT and MT according to the DRS scheme.

To be specific, the second sampling unit 131B may generate the second sampling signal SAMP<1> by sampling the second sub-pixel signal VPX<1> and the second sub-reset signal VRX<1> according to the DRS scheme, and the second comparison unit 133B may generate the second comparison signal COMP<1> by comparing the voltage level of the second sampling signal SAMP<1> with the voltage level of the ramp signal VRAMP, and the third counting unit 135_1B may count the second comparison signal COMP<1> in response to the first counting enable signal EN_CNT1, and the third latch unit 137_1B may latch the third counting signal CNT<2>, which is outputted from the third counting unit 135_1B, in response to the latch control signal LOAD. The third latch signal LAT<2>, which is latched in the third latch unit 137_1B, may correspond to a predetermined exposure time L3.

The first sub-pixel Gr1 may output the first sub-pixel signal VPX<0> corresponding to a charge, which is formed in the photo diode PD_Gr1 during a predetermined exposure time L2+L3+L4, to the first read-out block 130A in response to the first transmission signal TX0<0>, which is enabled when the medium period time MT ends.

Simultaneously, the second sub-pixel Gr2 may output the second sub-pixel signal VPX<1> corresponding to a charge, which is formed in the photo diode PD_Gr2 during the predetermined exposure time L4, to the second read-out block 130B in response to the second transmission signal TX0<1>, which is enabled when the medium period time MT ends.

The first read-out block 130A may read out the first sub-reset signal VRX<0> and the first sub-pixel signal VPX<0>, which are sequentially inputted during the medium and last period times MT and PT according to the CDS scheme.

To be specific, the first sampling unit 131A may generate the first sampling signal SAMP<0> by sampling the first sub-reset signal VRX<0> and the first sub-pixel signal VPX<0> according to the CDS scheme, and the first comparison unit 133A may generate the first comparison signal COMP<0> by comparing the voltage level of the first sampling signal SAMP<0> with the voltage level of the ramp signal VRAMP, and the second counting unit 135_3A may count the first comparison signal COMP<0> in response to the second counting enable signal EN_CNT2, which is enabled during the medium and last period times MT and PT, and the second latch unit 137_3A may latch the second counting signal CNT<1>, which is outputted from the second counting unit 135_3A, in response to the latch control signal LOAD. The second latch signal LAT<1>, which is latched in the second latch unit 137_3A, may correspond to a predetermined exposure time L2+L3+L4.

Simultaneously, the second read-out block 130B may read out the second sub-reset signal VRX<1> and the second sub-pixel signal VPX<1>, which are sequentially inputted during the medium and last period times MT and PT according to the CDS scheme.

To be specific, the second sampling unit 131B may generate the second sampling signal SAMP<1> by sampling the second sub-reset signal VRX<1> and the second sub-pixel signal VPX<1> according to the CDS scheme, and the second comparison unit 133B may generate the second comparison signal COMP<1> by comparing the voltage level of the second sampling signal SAMP<1> with the voltage level of the ramp signal VRAMP, and the fourth counting unit 135_3B may count the second comparison signal COMP<1> in response to the second counting enable signal EN_CNT2, and the fourth latch unit 137_3B may latch the fourth counting signal CNT<3> which is outputted from the fourth counting unit 135_3B, in response to the latch control signal LOAD. The fourth latch signal LAT<3>, which is latched in the fourth latch unit 137_3B, may correspond to the predetermined exposure time L4.

The image process block 140 may generate the first image data having the longest exposure time L1+L2+L3+L4 among the first to third image data by combining the first and second latch signals LAT<0:1>, the second image data having the medium exposure time L3 among the first to third image data based on the third latch signal LAT<2>, and the third image data having the shortest exposure time L4 among the first to third image data based on the fourth latch signal LAT<3>.

Although not illustrated, the predetermined exposure times L1, L2, L3 and L4 may be different from each other. For example, they may have a relationship of L1>L2>L3>L4. Therefore, the image process block 140 may generate the first to third image data having different exposure times during the single row line unit time at the first and second sub-pixels Gr1 and Gr2.

A described above, the first image data may have the longest exposure time L1+L2+L3+L4 and may be generated by combining the first and second latch signals LAT<0:1>. As a result, the amount of charge, which is greater than the maximum amount of the charge of the photo diode PD_Gr1 may be formed. In other words, a result of increasing a full well capacity (FWC) of the photo diode PD_Gr1 may be reflected in the first image data.

Similarly, the image process block 140 may generate the fourth image data having the longest exposure time L1+L2+L3+L4 among the fourth to sixth image data by combining the fifth and sixth latch signals LAT<4:5>, the fifth image data having the medium exposure time L3 among the fourth to sixth image data based on the seventh latch signal LAT<6>, and the sixth image data having the shortest exposure time L4 among the fourth to sixth image data based on the eighth latch signal LAT<7>. The fourth image data may have the longest exposure time L1+L2+L3+L4 among the fourth to sixth image data, and may be generated by combining the fifth and sixth latch signals LAT<4:5>. As a result, the amount of charge, which is greater than the maximum amount of charge of a photo diode PD_R1, may be formed. In other words, a result of increasing a full well capacity (FWC) of the photo diode PD_R1 may be reflected in the first image data.

Figure 6A:
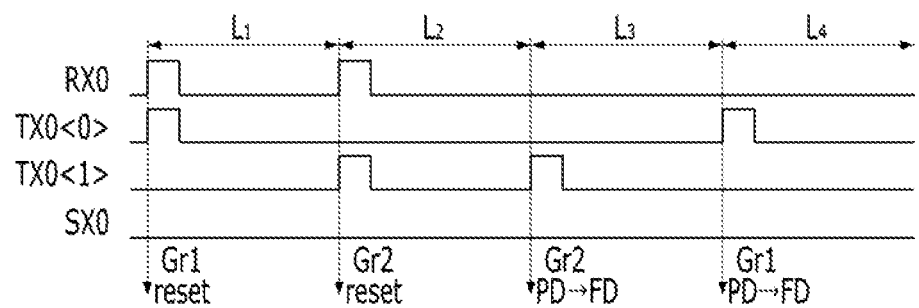
Figure 6B:
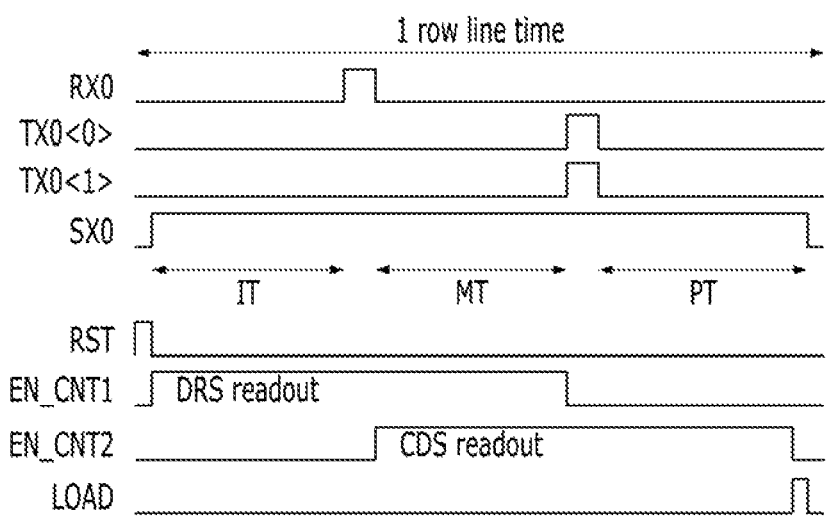

FIGS. 6A and 6B are timing diagrams illustrating the operation of the image sensing device 100.

FIG. 6A shows the operation of the image sensing device 100 during the exposure time section.

Referring to FIGS. 3 and 6A, the first sub-pixel Gr1 may be initialized in response to the first reset signal RX0 and the first transmission signal TX0<0> which are simultaneously enabled at a predetermined moment. An initialization operation of the first sub-pixel Gr1 is the same as described above with reference to FIGS. 3 and 5A.

The second sub-pixel Gr2 may be initialized in response to the first reset signal RX0 and the second transmission signal TX0<1>, which are simultaneously enabled after a predetermined time L1. An initialization operation of the second sub-pixel Gr2 is also the same as described above with reference to FIGS. 3 and 5A.

The second sub-pixel Gr2 may store a charge formed in a photo-diode PD_Gr2 during a predetermined exposure time L2 in the floating diffusion node FD in response to the second transmission signal TX0<1>, which is enabled after the predetermined exposure time L2.

The first sub-pixel Gr1 may store a charge formed in a photo-diode PD_Gr1 during a predetermined exposure time L1+L2+L3 in the floating diffusion node FD in response to the first transmission signal TX0<0> which is enabled after a predetermined exposure time L3.

FIG. 6B shows the operation of the image sensing device 100 during the read time section.

Referring to FIGS. 2, 4, and 6B, the read time section may include the single row line unit time. As described above with reference to Equation 1, the single row line unit time is a read-out time assigned to each pixel unit. The first and second sub-pixel signals VPX<0:1> and the first and second sub-reset signals VRX<0:1> may be read out from the first and second sub-pixels Gr1 and Gr2 within the single row line unit time.

The first sub-pixel Gr1 may output the first sub-pixel signal VPX<0> corresponding to a charge, which is stored in the floating diffusion node FD, to the first read-out block 130A during an initial period time IT in response to the first selection signal SX0. Simultaneously, the second sub-pixel Gr2 may output the second sub-pixel signal VPX<1> corresponding to a charge which is stored in the floating diffusion node FD, to the second read-out block 130B during the initial period time IT in response to the first selection signal SX0.

The first sub-pixel Gr1 may output the first sub-reset signal VRX<0> to the first read-out block 130A during a medium period time MT in response to the first reset signal RX0, which is enabled when the initial period time IT ends. Simultaneously, the second sub-pixel Gr2 may output the second sub-reset signal VRX<1> to the second read-out block 130B during the medium period time MT in response to the first reset signal RX0.

The first read-out block 130A may read out the first sub-pixel signal VPX<0> and the first sub-reset signal VRX<0>, which are sequentially inputted during the initial and medium period times IT and MT according to the DRS scheme.

To be specific, the first sampling unit 131A may generate the first sampling signal SAMP<0> by sampling the first sub-pixel signal VPX<0> and the first sub-reset signal VRX<0> according to the DRS scheme, and the first comparison unit 133A may generate the first comparison signal COMP<0> by comparing the voltage level of the first sampling signal SAMP<0> with the voltage level of the ramp signal VRAMP, and the first counting unit 135_1A may count the first comparison signal COMP<0> in response to the first counting enable signal EN_CNT1, which is enabled during the initial and medium period times IT and MT, and the first latch unit 137_1A may latch the first counting signal CNT<0>, which is outputted from the first counting unit 135_1A, in response to the latch control signal LOAD which is enabled when a last period time PT ends. The first latch signal LAT<0>, which is latched in the first latch unit 137_1A may correspond to a predetermined exposure time L1+L2+L3.

Simultaneously, the second read-out block 130B may read out the second sub-pixel signal VPX<1> and the second sub-reset signal VRX<1>, which are sequentially inputted during the initial and medium period times IT and MT according to the DRS scheme.

To be specific, the second sampling unit 131B may generate the second sampling signal SAMP<1> by sampling the second sub-pixel signal VPX<1> and the second sub-reset signal VRX<1> according to the DRS scheme and the second comparison unit 133B may generate the second comparison signal COMP<1> by comparing the voltage level of the second sampling signal SAMP<1> with the voltage level of the ramp signal VRAMP, and the third counting unit 135_1B may count the second comparison signal COMP<1> in response to the first counting enable signal EN_CNT1, and the third latch unit 137_1B may latch the third counting signal CNT<2> which is outputted from the third counting unit 135_1B, in response to the latch control signal LOAD. The third latch signal LAT<2>, which is latched in the third latch unit 137_1B, may correspond to a predetermined exposure time L2.

The first sub-pixel Gr1 may output the first sub-pixel signal VPX<0> corresponding to a charge, which is formed in the photo diode PD_Gr2 during a predetermined exposure time L4, to the first read-out block 130A in response to the first transmission signal TX0<0>, which is enabled when the medium period time MT ends.

Simultaneously, the second sub-pixel Gr2 may output the second sub-pixel signal VPX<1> corresponding to a charge, which is formed in the photo diode PD_Gr1 during a predetermined exposure time L3+L4, to the second read-out block 130B in response to the second transmission signal TX0<1> which is enabled when the medium period time MT ends.

The first read-out block 130A may read out the first sub-reset signal VRX<0> and the first sub-pixel signal VPX<0>, which are sequentially inputted during the medium and last period times MT and PT according to the CDS scheme.

To be specific, the first sampling unit 131A may generate the first sampling signal SAMP<0> by sampling the first sub-reset signal VRX<0> and the first sub-pixel signal VPX<0> according to the CDS scheme, and the first comparison unit 133A may generate the first comparison signal COMP<0> by comparing the voltage level of the first sampling signal SAMP<0> with the voltage level of the ramp signal VRAMP, and the second counting unit 135_3A may count the first comparison signal COMP<0> in response to the second counting enable signal EN_CNT2, which is enabled during the medium and last period times MT and PT, and the second latch unit 137_3A may latch the second counting signal CNT<1>, which is outputted from the second counting unit 135_3A, in response to the latch control signal LOAD. The second latch signal LAT<1>, which is latched in the second latch unit 137_3A, may correspond to the predetermined exposure time L4.

Simultaneously, the second read-out block 130B may read out the second sub-reset signal VRX<1> and the second sub-pixel signal VPX<1>, which are sequentially inputted during the medium and last period times MT and PT according to the CDS scheme.

To be specific, the second sampling unit 131B may generate the second sampling signal SAMP<1> by sampling the second sub-reset signal VRX<1> and the second sub-pixel signal VPX<1> according to the CDS scheme and the second comparison unit 133B may generate the second comparison signal COMP 1> by comparing the voltage level of the second sampling signal SAMP<1> with the voltage level of the ramp signal VRAMP, and the fourth counting unit 135_3B may count the second comparison signal COMP<1> in response to the second counting enable signal EN_CNT2, and the fourth latch unit 137_3B may latch the fourth counting signal CNT<3>, which is outputted from the fourth counting unit 135_3B in response to the latch control signal LOAD. The fourth latch signal LAT<3>, which is latched in the fourth latch unit 137_3B, may correspond to the predetermined exposure time L3+L4.

The image process block 140 may generate the first image data having the longest exposure time L1+L2+L3 among the first to fourth image data based on the first latch signal LAT<0>, the second image data having the first medium exposure time L2 among the first to fourth image data based on the third latch signal LAT<2> the third image data having the shortest exposure time L4 among the first to fourth image data based on the second latch signal LAT<1>, and the fourth image data having the second medium exposure time L3+L4 among the first to fourth image data based on the fourth latch signal LAT<3>.

Although not illustrated, the predetermined exposure times L1, L2, L3 and L4 may be different from each other. For example, they may have a relationship of L1>L2>L3>L4. Therefore, the image process block 140 may generate the first to fourth image data having different exposure times during the single row line unit time at the first and second sub-pixels Gr1 and Gr2.

As described above, the first image data may have the longest exposure time L1+L2+L3, and may be generated based on the first latch signal LAT<0>. As a result, the amount of charge, which is greater than the maximum amount of charge of the photo diode PD_Gr1, may be formed. In other words, a result of increasing a full well capacity (FWC) of the photo diode PD_Gr1 may be reflected in the first image data.

Similarly, the image process block 140 may generate the fifth image data having the longest exposure time L1+L2+L3 among the fifth to eighth image data based on the fifth latch signal LAT<4>, the sixth image data having the first medium exposure time L2 among the fifth to eighth image data based on the seventh latch signal LAT<6>, the seventh image data having the shortest exposure time L4 among the fifth to eighth image data based on the fifth latch signal LAT<1>, and the eighth image data having the second medium exposure time L3+L4 among the fifth to eighth image data based on the fourth latch signal LAT<3>. The fifth image data may have the longest exposure time L1+L2+L3 among the fifth to sixth image data, and may be generated based on the fifth latch signal LAT<4>. As a result, the amount of charge, which is greater than the maximum amount of charge of a photo diode PD_R1, may be formed. In other words, a result of increasing a full well capacity (FWC) of the photo diode PD_R1 may be reflected in the first image data.

Figure 7:
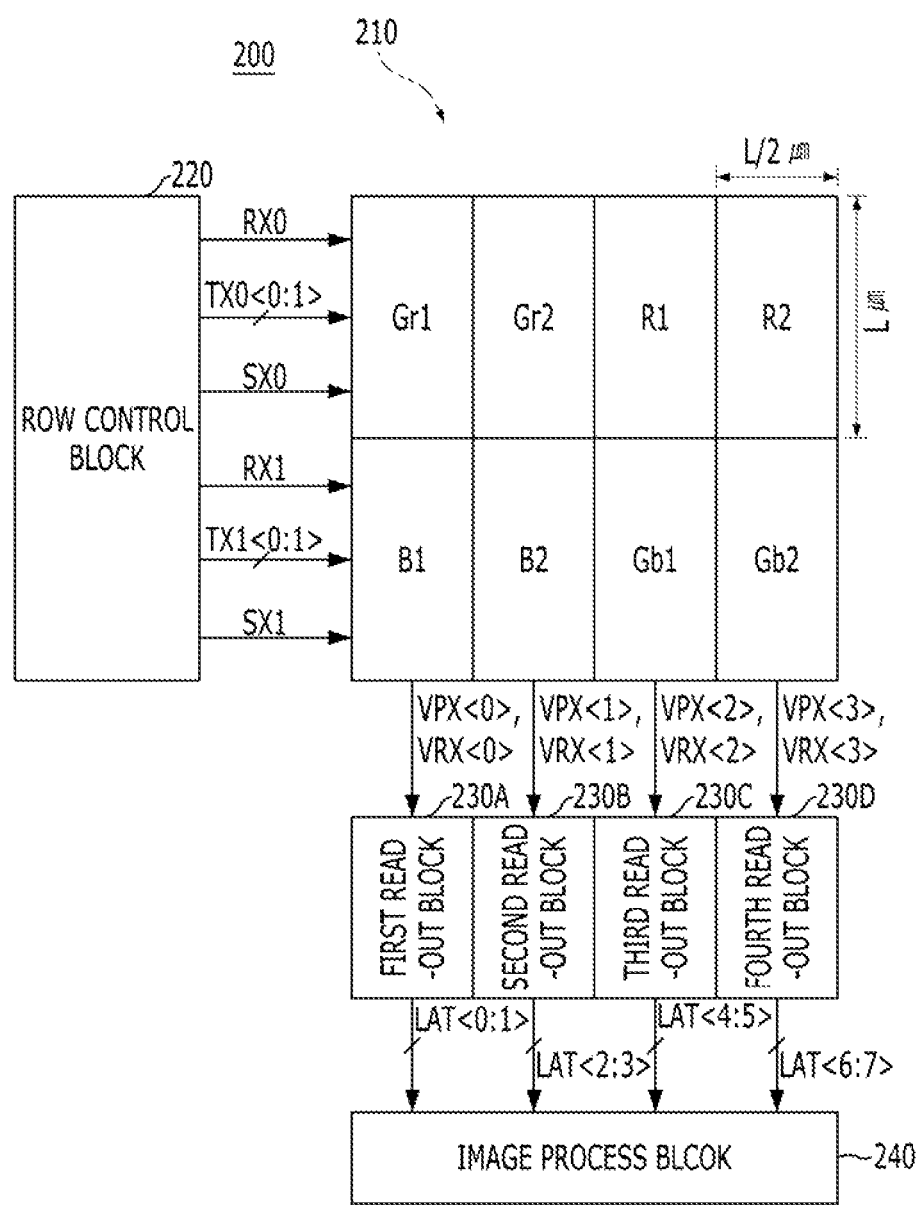
FIG. 7 is a block diagram illustrating an image sensing device in accordance with an embodiment of the present invention.

FIG. 7 is a block diagram illustrating an image sensing device in accordance with an exemplary embodiment of the present invention.

In an example that is simplified for clarity, the image sensing device in accordance with an exemplary embodiment of the present invention may comprise the cell of 2-by-2 pixel units described above with reference to FIG. 1.

Referring to FIG. 7, an image sensing device 200 may include a pixel array 210, a row control block 220, first to fourth read-out blocks 230A, 230B, 230C and 230D, and an image process block 240. The pixel array 210 may include first to fourth pixel units arranged in a matrix form. The row control block 220 may control an operation of the pixel array 210 on a row-by-row basis during an exposure time section and a read time section. The first to fourth read-out blocks 230A, 230B, 230C and 230D may read out first to fourth sub-pixel signals VPX<0:3>, which are outputted on a row-by-row basis from the pixel array 210 during the read time section. The image process block 240 processes first to eighth latch signals LAT<0:7>, which are outputted from the first to fourth read-out blocks 230A, 230B, 230C and 230D.

The image sensing device 200 may be the same as the image sensing device 100 described above with reference to FIGS. 1 to 3 except the first to fourth read-out blocks 230A, 230B, 230C and 230D, which will be described with reference to FIGS. 8 to 10B.

Figure 8:
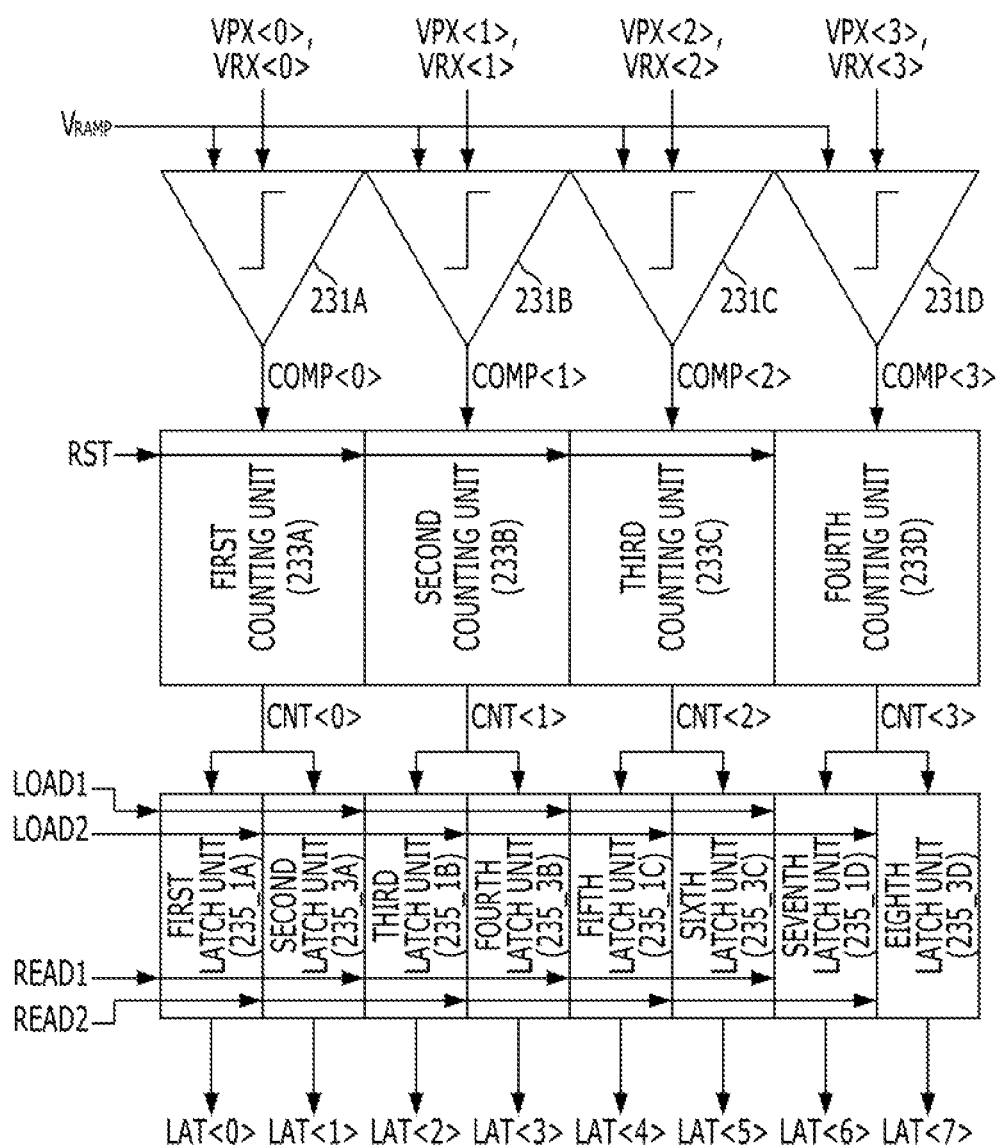
FIG. 8 is a circuit diagram illustrating read-out blocks shown in FIG. 7.

FIG. 8 is a circuit diagram illustrating the first to fourth read-out blocks 230A, 230B, 230C and 230D shown in FIG. 7.

Referring to FIG. 8, the first read-out block 230A may include a first comparison unit 231A, a first counting unit 233A, and first and second latch units 235_1A and 235_3A.

The first comparison unit 231A may alternately output as a first comparison signal COMP<0> a first pixel comparison signal by comparing a voltage level of a first sub-pixel signal VPX<0> with a voltage level of a ramp signal VRAMP, and a first reset comparison signal by comparing a voltage level of a first sub-reset signal VRX<0> with the voltage of the ramp signal VRAMP.

The first counting unit 233A may count the first comparison signal COMP<0> multiple times during the single row line unit time in response to an initialization control signal RST, which is periodically enabled at a predetermined period during the single row line unit time, and generate a first counting signal CNT<0> corresponding to a counting result. For example, the first counting unit 233A may perform a counting operation during each of an initial period time, a medium period time and a last period time of the single row line unit time, thereby completely performing the counting operations three times during the single row line unit time. In other words, the first counting unit 233A may count the first pixel comparison signal during the initial period time of the single row line unit time, count the first reset comparison signal during the medium period time of the single row line unit time, and count the first pixel comparison signal during the last period time of the single row line unit time.

The first and second latch units 235_1A and 235_3A may alternately latch the first counting signal CNT<0> in response to first and second latch control signals LOAD1 and LOAD2, which are alternately enabled at respective predetermined periods. For example, the first latch unit 235_1A may latch the first counting signal CNT<0> corresponding to the first pixel comparison signal in response to the first latch control signal LOAD1, and the second latch unit 235_3A may latch the first counting signal CNT<0> corresponding to the first reset comparison signal in response to the second latch control signal LOAD2. Also, the first and second latch units 235_1A and 235_3A may alternately output the first and second latch signals LAT<0:1> in response to first and second read-out control signals READ1 and READ2, which are alternately enabled at respective predetermined periods corresponding to the first and second latch control signals LOAD1 and LOAD2.

As a result, the image process block 240 may generate first to third image data having different exposure times in response to the first and second sub-pixel signals, e.g., VPX<0:1>, which are outputted from a pixel unit during the single row line unit time. Also, the image process block 240 may generate the fourth to sixth image data having different exposure times in response to the third and fourth sub-pixel signals, e.g., VPX<2:3>, which are outputted from a pixel unit during the single row line unit time.

Hereafter, an operation of the image sensing device 200 having the aforementioned structure in accordance with an exemplary embodiment of the present invention is described with reference to FIGS. 9A to 10B.

The operation of the image sensing device 200 be described with reference to the first pixel unit including the first and second sub-pixels Gr1 and Gr2, described above with reference to FIG. 3.

Figure 9A:
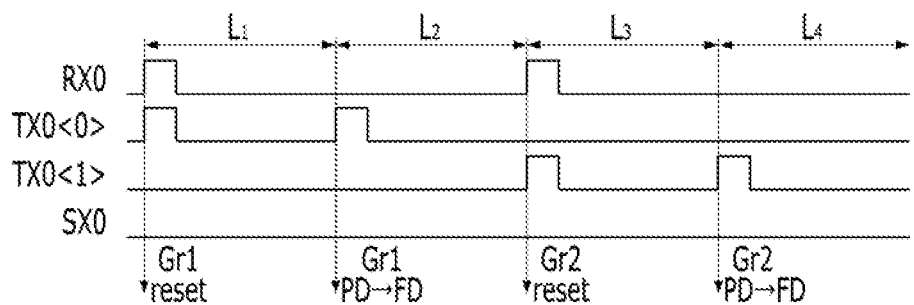
FIGS. 9A and 9B and FIGS. 10A and 10B are timing diagrams illustrating an operation of the image sensing device in accordance with an exemplary embodiment of the present invention.
Figure 9B:
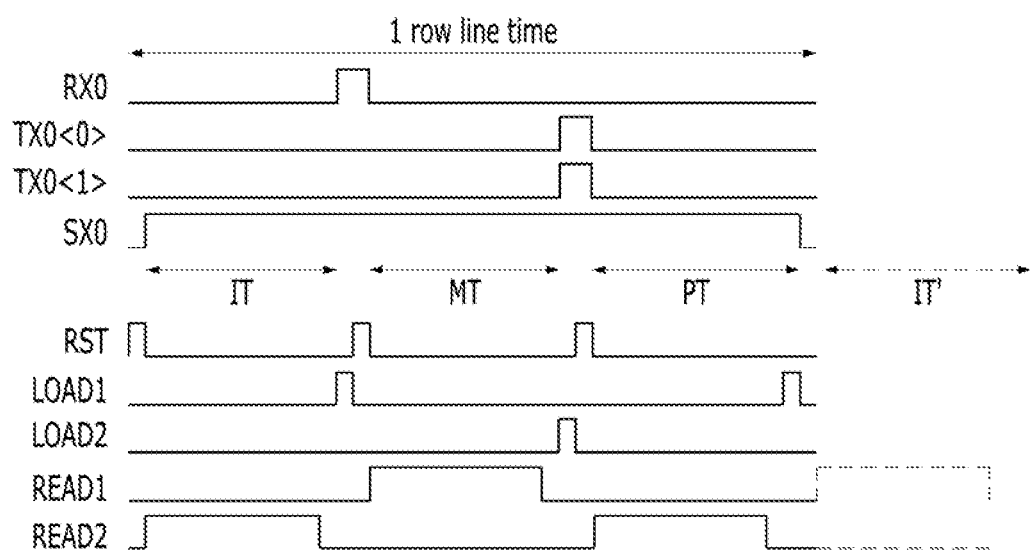

FIGS. 9A and 9B are timing diagrams illustrating the operation of the image sensing device 200.

FIG. 9A shows the operation of the image sensing device 200 during the exposure time section, which is the same as the operation of the image sensing device 100 during the exposure time section described above with reference to FIG. 5A. FIG. 9B shows the operation of the image sensing device 200 during the read time section.

Referring to FIGS. 2, 3, 8, and 9 the read time section may include the single row line unit time. As described above with reference to Equation 1, the single row line unit time is a read-out time assigned to each pixel unit. The first and second sub-pixel signals VPX<0:1> and the first and second sub-reset signals VRX<0:1> may be read out from the first and second sub-pixels Gr1 and Gr2 within the single row line unit time.

The first sub-pixel Gr1 may output the first sub-pixel signal VPX<0> corresponding to a charge, which is stored in the floating diffusion node FD, to the first read-out block 230A during the initial period time IT in response to the first selection signal SX0. Simultaneously, the second sub-pixel Gr2 may output the second sub-pixel signal VPX<1> corresponding to a charge, which is stored in the floating diffusion node FD, to the second read-out block 230B during the initial period time IT in response to the first selection signal SX0.

The first read-out block 230A may convert the first sub-pixel signal VPX<0> to a digital signal, and output the digital signal to the image process block 240.

To be specific, the first comparison unit 231A may generate the first comparison signal COMP<0> by comparing the voltage level of the first sub-pixel signal VPX<0> with the voltage level of the ramp signal VRAMP during the initial period time IT. The first counting unit 233A may generate the first counting signal CNT<0> by counting the first comparison signal COMP<0> in response to the initialization control signal RST during the initial period time IT. The first latch unit 235_1A may latch the first counting signal CNT<0> as a first front period input latch signal in response to the first latch control signal LOAD1. Subsequently, the first latch unit 235_1A may output the first front period input latch signal as the first latch signal LAT<0> to the image process block 240 in response to the first read-out control signal READ1. For example, the first latch unit 235_1A may output the first latch signal LAT<0> to the image process block 240 during the medium period time MT.

Simultaneously, the second read-out block 230B may convert the second sub-pixel signal VPX<1> to a digital signal, and output the digital signal to the image process block 240 in the same way as the first read-out block 230A, described above.

The first sub-pixel Gr1 may output the first sub-reset signal VRX<0> to the first read-out block 230A during the medium period time MT in response to the first reset signal RX0, which is enabled when the initial period time IT ends. Simultaneously, the second sub-pixel Gr2 may output the second sub-reset signal VRX<1> to the second read-out block 230B during the medium period time MT in response to the first reset signal RX0.

The first read-out block 230A may convert the first sub-reset signal VRX<0> to a digital signal, and output the digital signal to the image process block 240.

To be specific, the first comparison unit 231A may generate the first comparison signal COMP<0> by comparing the voltage level of the first sub-reset signal VRX<0> with the voltage level of the ramp signal VRAMP during the medium period time MT. The first counting unit 233A may generate the first counting signal CNT<0> by counting the first comparison signal COMP<0> in response to the initialization control signal RST during the medium period time MT. The second latch unit 235_3A may latch the first counting signal CNT<0> as a first reset latch signal in response to the second latch control signal LOAD2. Subsequently, the second latch unit 235_3A may output the first reset latch signal as the second latch signal LAT<1> to the image process block 240 in response to the second read-out control signal READ2. For example, the second latch unit 235_3A may output the second latch signal LAT<1> to the image process block 240 during the last period time PT.

Simultaneously, the second read-out block 230B may convert the second sub-reset signal VRX<1> to a digital signal, and output the digital signal to the image process block 240 in the same way as the first read-out block 230A, described above.

The first sub-pixel Gr1 may output the first sub-pixel signal VPX<0> corresponding to a charge, which is formed in the photo diode PD_Gr1 during a predetermined exposure time L2+L3+L4, to the first read-out block 230A in response to the first transmission signal TX0<0>, which is enabled when the medium period time MT ends. Simultaneously, the second sub-pixel Gr2 may output the second sub-pixel signal VPX<1> corresponding to a charge, which is formed in the photo diode PD_Gr2 during the predetermined exposure time L4, to the second read-out block 230B in response to the second transmission signal TX0<1> which is enabled when the medium period time MT ends.

The first read-out block 230A may convert the first sub-pixel signal VPX<0> to a digital signal, and output the digital signal to the image process block 240.

To be specific, the first comparison unit 231A may generate the first comparison signal COMP<0> by comparing the voltage level of the first sub-pixel signal VPX<0> with the voltage level of the ramp signal VRAMP during the last period time PT. The first counting unit 233A may generate the first counting signal CNT<0> by counting the first comparison signal COMP<0> in response to the initialization control signal RST during the last period time PT. The first latch unit 235_1A may latch the first counting signal CNT<0> as a first latter period input latch signal in response to the first latch control signal LOAD1. Subsequently, the first latch unit 235_1A may output the first latter period input latch signal as the first latch signal LAT<0> to the image process block 240 in response to the first read-out control signal READ1. For example, the first latch unit 235_1A outputs the first latch signal LAT<0> to the image process block 240 during an initial period time IT' of the next single row line unit time.

Simultaneously, the second read-out block 230B may convert the second sub-pixel signal VPX<1> to a digital signal and output the digital signal to the image process block 240 in the same way as the first read-out block 230A, as described above.

Meanwhile, the image process block 240 may generate first to third image data based on the first to fourth latch signals LAT<0:3>. For example, the image process block 240 may output earlier and latter noise-removed second latch signals. The earlier noise-removed second latch signal may represent the difference (LAT<1>−LAT<0>) between the first latch signal LAT<0> read out during the medium period time MT and the second latch signal LAT<1> read out during the last period time PT. The latter noise-removed second latch signal may represent the difference (LAT<1>−LAT<0>) between the second latch signal LAT<1> read out during the last period time PT and the first latch signal LAT<0> read out during the next initial period time IT'. Also, the image process block 240 may generate the first image data having the longest exposure time L1+L2+L3+L4 by combining the earlier and latter noise-removed second latch signals. In a similar way, the image process block 240 may generate the second image data having a medium exposure time L3 based on earlier and latter noise-removed third latch signals based on the second latch signal LAT<2>, which is previously inputted, and may generate the third image data having the shortest exposure time L4 based on earlier and latter noise-removed third latch signals based on the second latch signal LAT<2>, which is inputted next.

Although not illustrated, the predetermined exposure times L1, L2, L3 and L4 may be different from each other. For example, they may have a relationship of L1>L2>L3>L4. Therefore, the image process block 240 may generate the first to third image data having different exposure times during the single row line unit time at the first and second sub-pixels Gr1 and Gr2.

As described above, the first image data may have the longest exposure time L1+L2+L3+L4 based on the first and second latch signals LAT<0:1>. As a result, the amount of charge, which is greater than the maximum amount of charge of the photo diode PD_Gr1 may be formed. In other words, a result of increasing a full well capacity (FWC) of the photo diode PD_Gr1 may be reflected in the first image data.

Similarly, the image process block 240 may generate the fourth image data having the longest exposure time L1+L2+L3+L4, the fifth image data having the medium exposure time L3, the sixth image data having the shortest exposure time L4 among the fourth to sixth image data. The fourth image data may have the longest exposure time L1+L2+L3+L4 among the fourth to sixth image data based on the fifth and sixth latch signals LAT<4:5>. As a result, the amount of charge, which is greater than the maximum amount of charge of a photo diode PD_R1, may be formed. In other words, a result of increasing a full well capacity (FWC) of the photo diode PD_R1 may be reflected in the first image data.

Figure 10A:
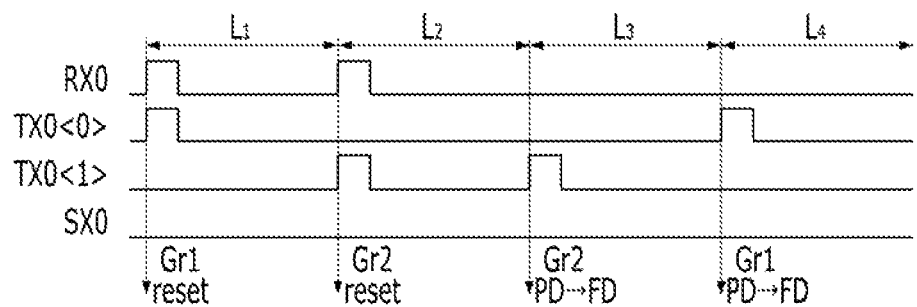
Figure 10B:
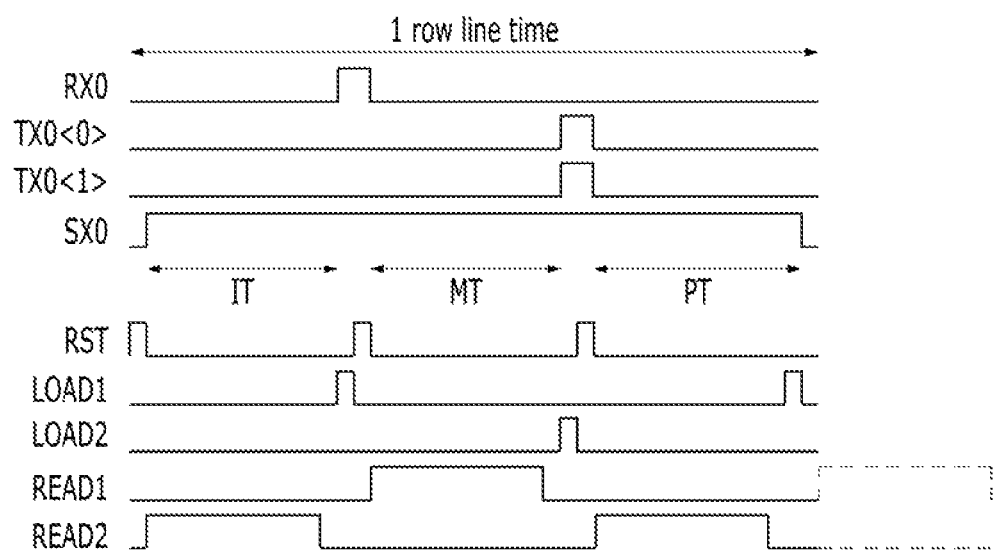

FIGS. 10A and 10B are timing diagrams illustrating the operation of the image sensing device 200.

FIG. 10A shows the operation of the image sensing device 200 during the exposure time section, which is the same as the operation of the image sensing device 100 during the exposure time section described above with reference to FIG. 6A. FIG. 10B shows the operation of the image sensing device 200 during the read time section, which is the same as the operation of the image sensing device 200 during the read section time section described above with reference to FIG. 9B.

When the image sensing device 200 operates as shown in FIGS. 10A and 10B, the image process block 240 may generate the first to fourth image data as shown in FIG. 6B. The first image data may have the longest exposure time L1+L2+L3 based on the first latch signal LAT<0>. As a result, the amount of charge, which is greater than the maximum amount of charge of the photo diode PD_Gr1, may be formed. In other words, a result of increasing a full well capacity (FWC) of the photo diode PD_Gr1 may be reflected in the first image data.

Similarly, the image process block 240 may generate the fifth image data having the longest exposure time L1+L2+L3 among the fifth to eighth image data based on the fifth latch signal LAT<4>, the sixth image data having the first medium exposure time L2 among the fifth to eighth image data based on the seventh latch signal LAT<6>, the seventh image data having the shortest exposure time L4 among the fifth to eighth image data based on the fifth latch signal LAT<1>, and the eighth image data having the second medium exposure time L3+L4 among the fifth to eighth image data based on the fourth latch signal LAT<3>. The fifth image data may have the longest exposure time L1+L2+L3 among the fifth to sixth image data, and may be generated based on the fifth latch signal LAT<4>. As a result, the amount of charge, which is greater than the maximum amount of charge of a photo diode PD_R1 may be formed. In other words, a result of increasing a full well capacity (FWC) of the photo diode PD_ R1 may be reflected in the first image data.

Figure 11:
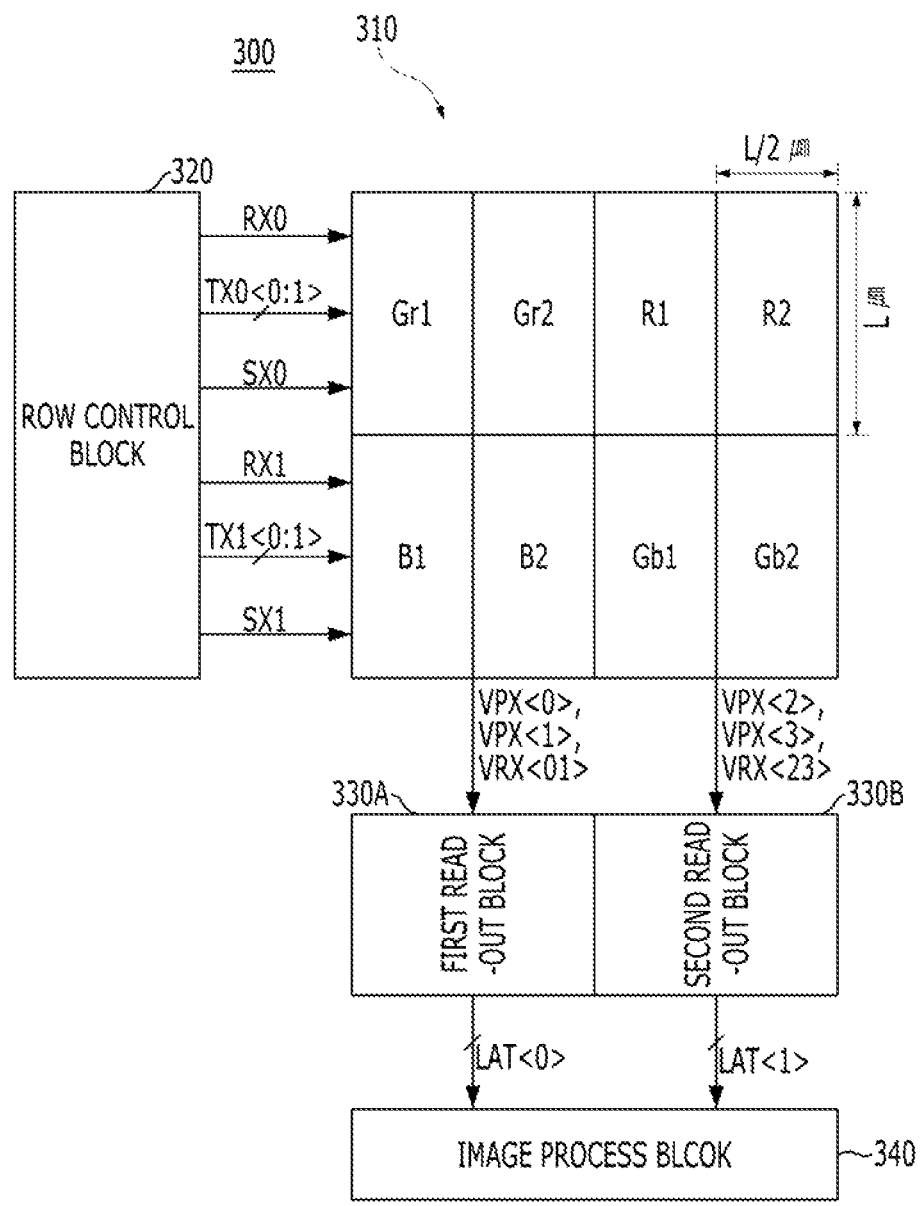
FIG. 11 is a block diagram illustrating an image sensing device in accordance with an exemplary embodiment of the present invention.

FIG. 11 is a block diagram illustrating an image sensing device 300 in accordance with an exemplary embodiment of the present invention.

In another example simplified for clarity, the image sensing device in accordance with an exemplary embodiment of the present invention may comprise the cell of 2-by-2 pixel units described above with reference to FIG. 1.

Referring to FIG. 11, an image sensing device 300 may include a pixel array 310, a row control block 320, first and second read-out blocks 330A and 330B, and an image process block 340. The pixel array 310 may include first to fourth pixel units arranged in a matrix form. The row control block 320 may control an operation of the pixel array 310 on row-by-row basis during an exposure time section and a read time section. The first and second read-out blocks 330A and 330B may sequentially read out in pairs first to fourth sub-pixel signals VPX<0:3>, which are outputted on row-by-row basis from the pixel array 310 during the read time section. The image process block 340 may process first and second latch signals LAT<0:1> which are outputted from the first and second read-out blocks 330A and 330B.

The pixel array 310 may include the first to fourth pixel units arranged in a matrix form. For example, the pixel array 310 may be arranged in a Bayer pattern. The pixel array 310 may be controlled based on control signals which are applied on a row-by-row basis from the row control block 320. For example, the first and second pixel units included in a first row may share a selection signal SX0, first and second transmission signals TX0<0:1>, and a first reset signal RX0. The third and fourth pixel units included in a second row may share a second selection signal SX1, third and fourth transmission signals TX1<0:1> and a second reset signal RX1.

Particularly, each of the first to pixel units may include two sub-pixels corresponding to an original color assigned thereto. Each of the sub-pixels may have a predetermined size of L/2 μm×L μm. For example, the first pixel unit corresponding to a green color Gr may include first and second sub-pixels Gr1 and Gr2 corresponding to the green color Gr, and the second pixel unit corresponding to a red color R may include first and second sub-pixels R1 and R2 corresponding to the red color R, and the third pixel unit corresponding to a blue color B may include first and second sub-pixels B1 and B2 corresponding to the blue color B, and the fourth pixel unit corresponding to a green color Gb may include first and second sub-pixels Gb1 and Gb2 corresponding to the green color Gb.

Figure 12:
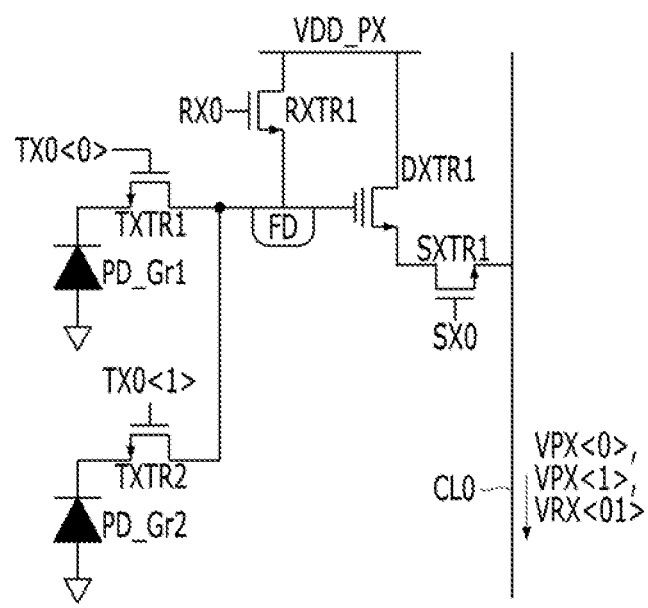
FIG. 12 is a circuit diagram illustrating a first pixel unit shown in FIG. 11.

FIG. 12 is a circuit diagram illustrating the first pixel unit shown in FIG. 11.

The first to fourth pixel units may have the same structure as one another, and FIG. 12 exemplarily shows the first pixel unit.

Referring to FIG. 12, the first pixel unit may have a shared pixel structure. In other words, the pixel unit may have two photo diodes PD_Gr1 and PD_Gr2 corresponding to the first and second sub-pixels Gr1 and Gr2, which are commonly coupled with a floating diffusion node FD through two transmission transistors TXTR1 and TXTR2. The first and second sub-pixels Gr1 and Gr2 may share a first common column line CL0, and a first sub-pixel signal VPX<0> corresponding to the first sub-pixel Gr1, a second sub-pixel signal VPX<1> corresponding to the second sub-pixel Gr2, and a first common reset signal VRX<01> of the first and second sub-pixels Gr1 and Gr2 may be selectively outputted through the first common column line CL0.

Referring back to FIG. 11, the row control block 320 may control the first sub-pixels Gr1, R1, B1 and Gb1 to be exposed for a first exposure time, and control the second sub-pixels Gr2, R2, B2 and Gb2 to be exposed for second and third exposure times during the exposure time section. The first to third exposure times may have different times from each other.

The row control block 320 may control the second and fourth sub-pixel signals VPX<1> and VPX<3> (hereinafter, refer to as 'second and fourth front period output sub-pixel signals') corresponding to the second exposure time during an initial period time of the single row line unit time during the read time section.

The row control block 320 may control the first and third sub-pixel signals VPX<0> and VPX<2> corresponding to the first exposure time during a medium period time of the single row line unit time during the read time section.

The row control block 320 may control the second and fourth sub-pixel signals VPX<1> and VPX<3> (hereinafter, refer to as 'second and fourth latter period output sub-pixel signals') corresponding to the third exposure time during a last period time of the single row line unit time during the read time section.

As described above with reference to Equation 1, the single row line unit time is a read-out time assigned to each pixel unit. The first and second sub-pixel signals VPX<0:1> and the first and second sub-reset signals VRX<0:1> may be read out from the first and second sub-pixels Gr1 and Gr2 within the single row line unit time.

The first and second read-out blocks 330A and 330B may read out the second and fourth front period output sub-pixel signals VPX<1> and VPX<3> according to the DRS scheme, read out the first and third sub-pixel signals VPX<0> and VPX<2> according to the CDS scheme, and read out the second and fourth latter period output sub-pixel signals VPX<1> and VPX<3> according to the CDS scheme. The first and second read-out blocks 330A and 330B may read out the pixel signals first, and then the reset signals according to the DRS scheme. Or, the first and second read-out blocks 330A and 330B may read out the reset signals first, and then the pixel signals according to the CDS scheme.

Figure 13:
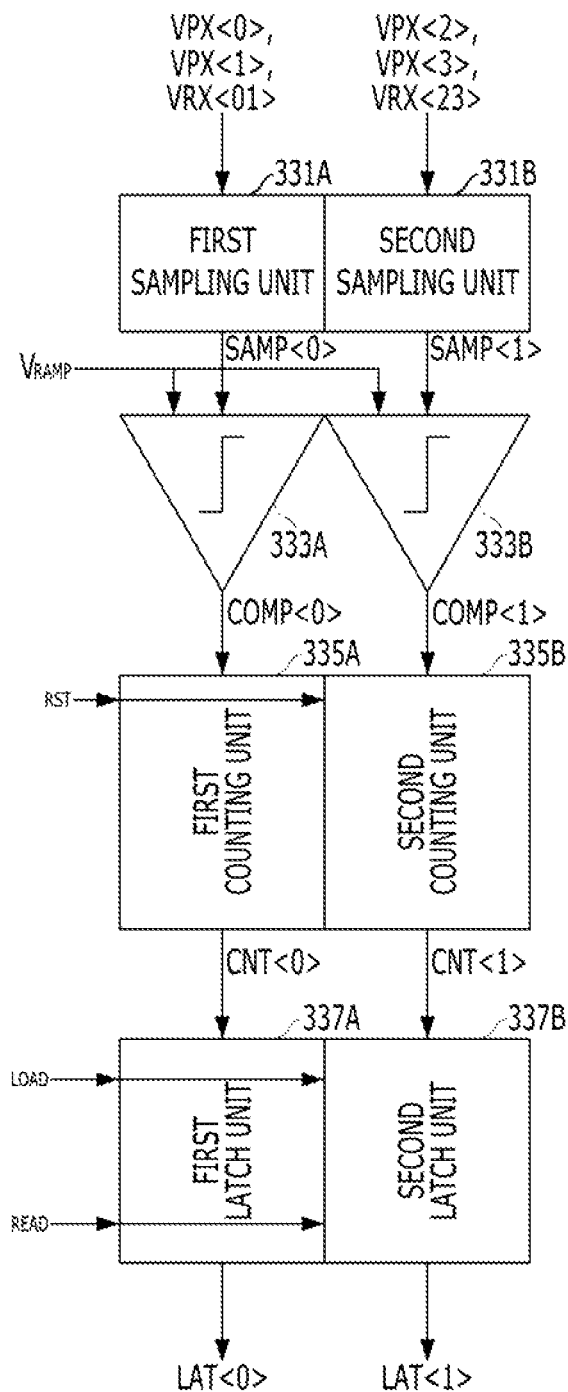
FIG. 13 is a block diagram illustrating read-out blocks shown in FIG. 11.

FIG. 13 is a block diagram illustrating the first and second read-out blocks 330A and 330B shown in FIG. 11.

Referring to FIG. 13, the first read-out block 330A may include a first sampling unit 331A, a first comparison unit 333A, a first counting unit 335A and a first latch unit 337A.

The first sampling unit 331A may sample the second front period output sub-pixel signal VPX<1> and the first common reset signal VRX<01> which are sequentially inputted during the initial period time according to the DRS scheme. For example, the first sampling unit 331A may output a signal, which represents the difference between the second front period output sub-pixel signal VPX<1> and the first common reset signal VRX<01> (VRX<01>−VPX<1>) sequentially inputted during the initial period time, as a first sampling signal SAMP<0>.

The first sampling unit 331A may sample the first common reset signal VRX<01> and the first sub-pixel signal VPX<0>, which are sequentially inputted during the medium period time according to the CDS scheme. For example, the first sampling unit 331A may output a signal, which represents the difference between the first common reset signal VRX<01> and the first sub-pixel signal VPX<0> (VRX<01>–VPX<0>) sequentially inputted during the medium period time, as the first sampling signal SAMP<0>.

The first sampling unit 331A may sample the first common reset signal VRX<01> and the second latter period output sub-pixel signal VPX<1>, which are sequentially inputted during the last period time according to the CDS scheme. For example, the first sampling unit 331A may output a signal, which represents the difference between the first common reset signal VRX<01> and the second latter period output sub-pixel signal VPX<1> (VRX<01>–VPX<1>) sequentially inputted during the last period time, as the first sampling signal SAMP<0>.

To sum up, the first sampling unit 331A may sequentially output the second front period output sub-pixel signal, which is sampled according to the DRS scheme, then the first sub-pixel signal, which is sampled according to the CDS scheme, and then the second latter period output sub-pixel signal, which is sampled according to the CDS scheme, as the first sampling signal SAMP<0>, respectively during the initial, medium, and last period times.

The first comparison unit 333A may compare a voltage level of the first sampling signal SAMP<0> with a voltage level of a ramp signal VRAMP, and generate a first comparison signal COMP<0> corresponding to a comparison result.

For example, during each of the initial, medium, and last period times, the first comparison unit 333A may compare the voltage level of the first sampling signal SAMP<0> with the voltage level of the ramp signal VRAMP, and output a first initial, medium, and last comparison signals corresponding to the comparison results as the first comparison signal COMP<0>.

The first counting unit 335A may count the first comparison signal COMP<0> in response to an initialization control signal RST, which is enabled during the initial, medium, and last period times, and generate a first counting signal CNT<0> corresponding to a counting result.

For example, the first counting unit 335A may count the first comparison signal COMP<0> during each of the initial, medium, and last period times in response to the initialization control signal RST, which is enabled when each of the initial, medium, and last period times starts, and output a first initial, medium, and last counting signal corresponding to the respective counting result as the first counting signal CNT<0>.

The first latch unit 337A may latch the first counting signal CNT<0> in response to a latch control signal LOAD, and output a first latch signal LAT<0> to the image process block 340 in response to a read-out control signal READ.

For example, the first latch unit 337A may latch the first counting signal CNT<0> as first initial, medium, and last latch signals in response to the latch control signal LOAD, which is enabled when each of the initial, medium, and last period times ends, and output each of the first initial, medium, and last latch signals as the first latch signal LAT<0> in response to the read-out control signal READ, which is enabled during the medium, last, and initial period times following each enablement of the latch control signal LOAD.

The second read-out block 330B may have the same structure as the first read-out block 330A described above.

Referring back to FIG. 11, the image process block 340 may generate first to sixth image data, which have different exposure times, based on the first and second latch signals LAT<0:1>.

For example, the image process block 340 may generate the first image data having the medium exposure time among the first to third image data based on the first latch signal LAT<0> corresponding to the first initial latch signal, the second image data having the longest exposure time among the first to third image data based on the first latch signal LAT<0> corresponding to the first medium latch signal, and the third image data having the shortest exposure time among the first to third image data based on the first latch signal LAT<0>.

Similarly, the image process block 340 may generate the fourth image data having the medium exposure time among the fourth to sixth image data based on the second latch signal LAT<1> corresponding to the first initial latch signal, the fifth image data having the longest exposure time among the fourth to sixth image data based on the second latch signal LAT<1> corresponding to the first medium latch signal, and the sixth image data having the shortest exposure time among the fourth to sixth image data based on the second latch signal LAT<1> corresponding to the first last latch signal.

As a result, the image process block 340 may generate the first to third image data having different exposure times based on the first latch signal LAT<0>, which are outputted from a pixel unit during the single row line unit time. Also, the image process block 340 may generate the fourth to sixth image data having different exposure times based on the second latch signal LAT<1>, which are outputted from a pixel unit during the single row line unit time.

Hereafter, an operation of the image sensing device 300 having the aforementioned structure in accordance with an exemplary embodiment of the present invention is described with reference to FIGS. 14A and 14B.

Figure 14A:
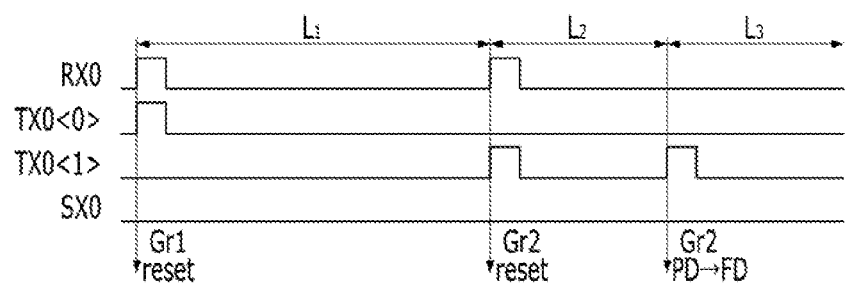
FIGS. 14A and 14B are timing diagrams illustrating an operation of the image sensing device in accordance with an exemplary embodiment of the present invention.
Figure 14B:
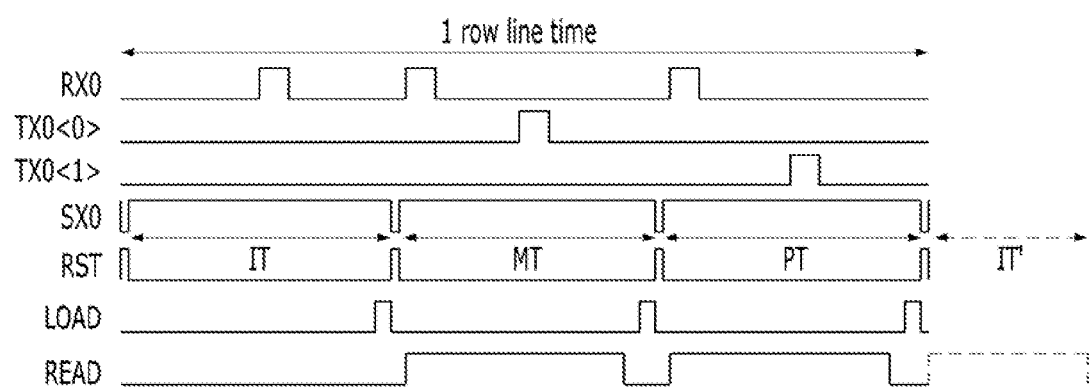

FIG. 14A is a timing diagram illustrating the operation of the image sensing device 300 during the exposure time section, and the read time section, respectively.

In the description, the operation of the mage sensing device 300 will be described with reference to the first pixel unit including the first and second sub-pixels Gr1 and Gr2 described above with reference to FIG. 12.

Referring to FIGS. 12 and 14A, the first sub-pixel Gr1 may be initialized in response to the first reset signal RX0 and the first transmission signal TX0<0>, which are simultaneously enabled at a predetermined moment. For example, during an initialization operation of the first sub-pixel Gr1, the photo-diode PD_Gr1 may be initialized while a charge existing in the photo-diode PD_Gr1 is discharged to a power source voltage VDD_VPX terminal through the transmission transistor TXTR1 and the reset transistor RXTR1.

The second sub-pixel Gr2 may be initialized in response to the first reset signal RX0 and the second transmission signal TX0<1>, which are simultaneously enabled after a predetermined time L1. The initialization operation of the second sub-pixel Gr2 is the same as the initialization operation of the first sub-pixel Gr1, described above.

The second sub-pixel Gr2 may store a charge formed in the photo diode PD_Gr2 during a predetermined exposure time L2 in the floating diffusion node FD in response to the second transmission signal TX0<1>, which is enabled after the predetermined time L2.

Referring to FIGS. 11, 12, 13, and 14B, the read time section may include the single row line unit time. As described above with reference to Equation 1, the single row line unit time is a read-out time assigned to each pixel unit. The first and second sub-pixel signals VPX<0:1> and the first common reset signal VRX<01> may be read out from the first and second sub-pixels Gr1 and Gr2 within the single row line unit time.

The second sub-pixel Gr2 may output the second front period output sub-pixel signal VPX<1> and the first common reset signal VRX<01> to the first read-out block 330A in response to the first selection signal SX0 and the first reset signal RX0 during an initial period time IT.

For example, the second sub-pixel Gr2 may output the second front period output sub-pixel signal VPX<1> corresponding to the charge stored in the floating diffusion node FD to the first read-out block 330A in response to the first selection signal SX0, and then output the first common reset signal VRX<01> to the first read-out block 330A in response to the first selection signal SX0 and the first reset signal RX0.

The first read-out block 330A may convert the second front period output sub-pixel signal VPX<1> into a digital signal and output the digital signal to the image process block 340.

To be specific, the first sampling unit 331A may generate the first sampling signal SAMP<0> by sampling the second front period output sub-pixel signal VPX<1> and the first common reset signal VRX<01>, which are sequentially inputted according to the DRS scheme. The first comparison unit 333A may generate the first comparison signal COMP<0> by comparing the voltage level of the first sampling signal SAMP<0> with the voltage level of the ramp signal VRAMP. The first counting unit 335A may count the first comparison signal COMP<0> in response to the initialization control signal RST, which is enabled when the initial period time IT starts. The first latch unit 337A may latch the first counting signal CNT<0>, which is outputted from the first counting unit 335A, in response to the latch control signal LOAD, which is enabled when the initial period time IT ends. The first latch signal LAT<0> latched in the first latch unit 337A may correspond to the predetermined exposure time L2. The first latch unit 337A may output the first latch signal LAT<0> to the image process block 340 in response to the read-out control signal READ, which is enabled during the medium period time MT.

Therefore, the image process block 340 may generate the first image data having the medium exposure time L2 among the first to third image data based on the first latch signal LAT<0>, which is inputted during the medium period time MT.

The first sub-pixel Gr1 may output the first common reset signal VRX<01> and the first sub-pixel signal VPX<0> to the first read-out block 330A in response to the first reset signal RX0, the first transmission signal TX0<0> and the first selection signal SX0 during the medium period time MT.

For example, the first sub-pixel Gr1 may output the first common reset signal VRX<01> to the first read-out block 330A in response to the first selection signal SX0 and the first reset signal RX0, and then output the first sub-pixel signal VPX<0> to the first read-out block 330A in response to the first selection signal SX0 and the first transmission signal TX0<0>.

The first read-out block 330A may convert the first sub-pixel signal VPX<0> into a digital signal and output the digital signal to the image process block 340.

To be specific, the first sampling unit 331A may generate the first sampling signal SAMP<0> by sampling the first common reset signal VRX<01> and the first sub-pixel signal VPX<0> which are sequentially inputted according to the CDS scheme. The first comparison unit 333A may generate the first comparison signal COMP<0> by comparing the voltage level of the first sampling signal SAMP<0> with the voltage level of the ramp signal VRAMP. The first counting unit 335A may count the first comparison signal COMP<0> in response to the initialization control signal RST, which is enabled again when the medium period time MT starts. The first latch unit 337A may latch the first counting signal CNT<0>, which is outputted from the first counting unit 335A, in response to the latch control signal LOAD, which is enabled again when the medium period time MT ends. The first latch signal LAT<0> that is latched in the first latch unit 337A may correspond to a predetermined exposure time L1+L2+L3. The first latch unit 337A may output the first latch signal LAT<0> to the image process block 340 in response to the read-out control signal READ, which is enabled again during a last period time PT.

Therefore, the image process block 340 may generate the second image data having the longest exposure time L1+L2+L3 among the first to third image data based on the first latch signal LAT<0>, which is inputted during the last period time PT.

The second sub-pixel Gr2 may output the first common reset signal VRX<01> and the second latter period output sub-pixel signal VPX<1> to the first read-out block 330A in response to the first reset signal RX0, the second transmission signal TX0<1> and the first selection signal SX0, during the last period time PT.

For example, the second sub-pixel Gr2 may output the first common reset signal VRX<01> to the first read-out block 330A in response to the first selection signal SX0 and the first reset signal RX0, and then output the second latter period output sub-pixel signal VPX<1> to the first read-out block 330A in response to the first selection signal SX0 and the second transmission signal TX0<1>.

The first read-out block 330A may convert the second latter period output sub-pixel signal VPX<1> into a digital signal and output the digital signal to the image process block 340.

To be specific, the first sampling unit 331A may generate the first sampling signal SAMP<0> by sampling the first common reset signal VRX<01> and the second latter period output sub-pixel signal VPX<1>, which are sequentially inputted according to the CDS scheme. The first comparison unit 333A may generate the first comparison signal COMP<0> by comparing the voltage level of the first sampling signal SAMP<0> with the voltage level of the ramp signal VRAMP. The first counting unit 335A may count the first comparison signal COMP<0> in response to the initialization control signal RST, which is enabled again when the last period time PT starts. The first latch unit 337A may latch the first counting signal CNT<0>, which is outputted from the first counting unit 335A, in response to the latch control signal LOAD, which is enabled again when the last period time PT ends. The first latch signal LAT<0> latched in the first latch unit 337A may correspond to a predetermined exposure time L3. The first latch unit 337A may output the first latch signal LAT<0> to the image process block 340 in response to the read-out control signal READ, which is enabled again during an initial period time IT' of the next single row line unit time.

Therefore, the image process block 340 may generate the third image data having the shortest exposure time L3 among the first to third image data based on the first latch signal LAT<0> which is inputted during the initial period time IT' of the next single row line unit time.

The embodiments of the present invention have an advantage in that the dynamic range of an image sensing device may be improved as image data having different exposure times for each frame are generated on the basis of the pixel unit during a single row line unit time. Therefore, motion artifacts occurring in moving images may be minimized in accordance with the embodiments of the present invention.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

What is claimed is:

1. An operating method for an image sensing device, comprising:
    outputting a plurality of control signals having a plurality of selection signals, a plurality of transmission signals and a plurality of reset signals to a pixel unit including a first sub-pixel and a second sub-pixel corresponding to each single color;
    controlling exposure times of the first and second sub-pixels differently from one another during an exposure time section;
    controlling a first sub-pixel signal and a second sub-pixel signal respectively outputted from the first and second sub-pixels during a single row line unit time during a read time section;
    receiving the first and second sub-pixel signals from the pixel unit by an image sensor which generates three or more image data, each of which has different exposure time to one another based on the first and second sub-pixel signals;
    controlling the first sub-pixel to be exposed for first and second exposure times, and controlling the second sub-pixel to be exposed for third and fourth exposure times during the exposure time section;
    controlling the first sub-pixel signal exposed for the first exposure time and the second sub-pixel signal exposed for the third exposure time to be outputted during an initial period time of the single row line unit time;
    controlling a first sub-reset signal and a second sub-reset signal respectively outputted from the first sub-pixel and the second sub-pixel during a medium period time of the single row line unit time; and
    controlling the first sub-pixel signal exposed for the second exposure time and the second sub-pixel signal exposed for the fourth exposure time to be outputted during a last period time of the single row line unit time, during the read time section,
    wherein the pixel unit is controlled by the plurality of control signals having the plurality of selection signals, the plurality of transmission signals and the plurality of reset signals.

2. The operating method of claim 1, wherein the single row line unit time is defined by Equation 1:

Single row line unit time=1/frame rate/the total number of rows, [Equation 1]

wherein the total number of the rows is determined based on a pixel array.

3. The operating method of claim 1, further comprising:
    selectively transmitting by a first column line coupled to the first sub-pixel, the first sub-pixel signal and the first sub-reset signal which is outputted from the first sub-pixel;
    selectively transmitting by a second column line coupled to the second sub-pixel, the second sub-pixel signal and the second sub-reset signal which is outputted from the second sub-pixel;
    reading out by a first read-out circuit block coupled to the first column line, the first sub-pixel signal according to a Delta-Reset Sampling (DRS) scheme and according to a Correlated-Double Sampling (CDS) scheme; and
    reading out by a second read-out circuit block coupled to the second column line, the second sub-pixel signal according to the DRS scheme and the CDS scheme.

4. The operating method of claim 3, wherein the first read-out circuit block includes:
    a first sampling unit sampling the first sub-pixel signal corresponding to the first exposure time, and the first sub-reset signal according to the DRS scheme during the initial period time, and sampling the first sub-reset signal, and the first sub-pixel signal corresponding to the second exposure time according to the CDS scheme during the last period time;
    a first comparison unit generating a first comparison signal by comparing a first sampling signal outputted from the first sampling unit with a ramp signal;
    a first counting unit generating a first counting signal by counting the first comparison signal based on a first counting enable signal, which is enabled during the initial and medium period times;
    a second counting unit generating a second counting signal by counting the first comparison signal based on a second counting enable signal, which is enabled during the medium and last period times;
    a first latch unit latching the first counting signal based on a latch signal, which is enabled after the last period time; and
    a second latch unit latching the second counting signal based on the latch signal.

5. The operating method of claim 4, wherein the second read-out circuit block includes:
    a second sampling unit sampling the second sub-reset signal, and the second sub-pixel signal corresponding to the third exposure time according to the DRS scheme during the initial period time, and sampling the second sub-reset signal, and the second sub-pixel signal corresponding to the fourth exposure time according to the CDS scheme during the last period time;
    a second comparison unit generating a second comparison signal by comparing a second sampling signal outputted from the second sampling unit with the ramp signal;
    a third counting unit generating a third counting signal by counting the second comparison signal based on the first counting signal;
    a fourth counting unit generating a fourth counting signal by counting the second comparison signal based on the second counting signal;
    a third latch unit latching the third counting signal based on the latch signal; and
    a fourth latch unit latching the fourth counting signal based on the latch signal.

6. The operating method of claim 5, further comprising generating first to third image data having different exposure times based on first to fourth latch signals which are latched in the first to fourth latch units.

7. The operating method of claim 6, further comprising generating the first image data having a longest exposure time among the first to third image data by combining the first and second latch signals, the second image data having a medium exposure time among the first to third image data based on the third latch signal, which is latched in the third latch unit, and the third image data having a shortest exposure time among the first to third image data based on the fourth latch signal, which is latched in the fourth latch unit.

8. The operating method of claim 5, further comprising generating first to fourth image data having different exposure times based on first to fourth latch signals, which are latched in the first to fourth latch units.

9. The operating method of claim 3, wherein the first read-out circuit block includes:
   a first comparison unit generating a first front period output comparison signal by comparing the first sub-pixel signal with a ramp signal during the initial period time, generating a first reset comparison signal by comparing the first sub-reset signal with the ramp signal during the medium period time, and generating a first latter period output comparison signal by comparing the first sub-pixel signal with the ramp signal during the last period time;
   a first counting unit generating a first front period output counting signal by counting the first front period output comparison signal during the initial period time, generating a first reset counting signal by counting the first reset comparison signal during the medium period time, and generating a first latter period output counting signal by counting the first latter period output comparison signal during the last period time, based on an initialization control signal;
   a first latch unit latching the first front period output counting signal when the initial period time ends, and latching the first latter period output counting signal when the last period time ends, based on a first latch control signal, and outputting a first front period input latch signal corresponding to the first front period output counting signal during the medium period time, and outputting a first latter period input latch signal corresponding to the first latter period output counting signal during an initial period time of a next single row line unit time, based on a first read-out control signal; and
   a second latch unit latching the first reset counting signal when the medium period time ends based on a second latch control signal, and outputting a first reset latch signal corresponding to the first reset counting signal during the last period time based on a second read-out control signal.

10. The operating method of claim 9, wherein the second read-out circuit block includes:
    a second comparison unit generating a second front period output comparison signal by comparing the second sub-pixel signal with the ramp signal during the initial period time, generating a second reset comparison signal by comparing the second sub-reset signal with the ramp signal during the medium period time, and generating a second latter period output comparison signal by comparing the second sub-pixel signal with the ramp signal during the last period time;
    a second counting unit generating a second front period output counting signal by counting the second front period output comparison signal during the initial period time, generating a second reset counting signal by counting the second reset comparison signal during the medium period time, and generating a second latter period output counting signal by counting the second latter period output comparison signal during the last period time, based on the initialization control signal;
    a third latch unit latching the second front period output counting signal when the initial period time ends, and latching the second latter period output counting signal when the last period time ends, based on the first latch control signal, and outputting a second front period input latch signal corresponding to the second front period output counting signal during the medium period time, and outputting a second latter period input latch signal corresponding to the second latter period output counting signal during an initial period time of the next single row line unit time, based on the second read-out control signal; and
    a fourth latch unit latching the second reset counting signal when the medium period time ends based on the second latch control signal, and outputting a second reset latch signal corresponding to the second reset counting signal during the last period time based on the second read-out control signal.

11. The operating method of claim 10, further comprising generating first to third image data or first to fourth image data having different exposure times based on the first and second front period input latch signals and the first and second latter period input latch signals.

12. The operating method of claim 11, further comprising generating the first to third image data or the first to fourth image data while noise of the first front period input latch signal and the first latter period input latch signal is removed based on the first reset latch signal, and noise of the second front period input latch signal and the second latter period input latch signal is removed based on the second reset latch signal.

13. An operating method for an image sensing device, comprising:
    outputting a plurality of control signals having a plurality of selection signals, a plurality of transmission signals and a plurality of reset signals to a pixel unit including a first sub-pixel and a second sub-pixel corresponding to each single color;
    controlling exposure times of the first and second sub-pixels differently from one another during an exposure time section;
    controlling a first sub-pixel signal and a second sub-pixel signal to be outputted from the first and second sub-pixels during a single row line unit time during a read time section;
    receiving the first and second sub-pixel signals from the pixel unit by an image sensor which generates three or more image data, each of which has different exposure time to one another based on the first and second sub-pixel signals;
    controlling the first sub-pixel to be exposed for a first exposure time;
    controlling the second sub-pixel to be exposed for second and third exposure times during the exposure time section,
    controlling the second sub-pixel signal corresponding to the second exposure time to be outputted during an initial period time of the single row line unit time during the read time section,
    controlling the first sub-pixel signal corresponding to the first exposure time to be outputted during a medium period time of the single row line unit time during the read time section, and
    controlling the second sub-pixel signal corresponding to the third exposure time to be outputted during a last period time of the single row line unit time during the read time section, wherein the pixel unit is controlled by the plurality of control signals having the plurality of selection signals, the plurality of transmission signals and the plurality of reset signals.

14. The operating method of claim 13, wherein the first and second sub-pixels share a single floating diffusion node.

15. The operating method of claim 14, further comprising:
selectively transmitting by a common column line commonly coupled to the first and second sub-pixels, the first and second sub-pixel signals and a common reset signal of the first and second sub-pixels; and
reading out by a common read-out circuit block coupled to the common column line, the first and second sub-pixel signals respectively according to a DRS scheme and a CDS scheme.

16. The operating method of claim 15, wherein the common read-out circuit block includes:
a sampling unit sampling the common reset signal and the second sub-pixel signal corresponding to the second exposure time according to the DRS scheme during the initial period time, sampling the common reset signal and the first sub-pixel signal corresponding to the first exposure time according to the CDS scheme during the medium period time, and sampling the common reset signal and the second sub-pixel signal corresponding to the third exposure time according to the CDS scheme during the last period time;
a comparison unit comparing a voltage level of a sampling signal outputted from the sampling unit with a voltage level of a ramp signal, and generating an initial comparison signal corresponding to a comparison result during the initial period time, comparing the voltage level of the sampling signal with the voltage level of the ramp signal, and generating a medium comparison signal corresponding to a comparison result during the medium period time, and comparing the voltage level of the sampling signal with the voltage level of the ramp signal, and generating a last comparison signal corresponding to a comparison result during the last period time;
a counting unit counting the initial comparison signal, and generating an initial counting signal corresponding to a counting result during the initial period time, counting the medium comparison signal, and generating a medium counting signal corresponding to a counting result during the medium period time, and counting the last comparison signal, and generating a last counting signal corresponding to a counting result during the last period time, in response to an initialization control signal; and
a latch unit latching the initial counting signal when the initial period time ends, the medium counting signal when the medium period time ends, and the last counting signal when the last period time ends, in response to a latch control signal, and outputting an initial latch signal corresponding to the initial counting signal during the medium period time, and a medium latch signal corresponding to the medium counting signal during the last period time, and a last latch signal corresponding to the last counting signal during an initial period time of a next single row line unit time, in response to a read-out control signal.

17. The operating method of claim 16, further comprising generating first to third image data having different exposure times based on the initial latch signal, the medium latch signal and the last latch signal.

* * * * *